United States Patent
Lin

(10) Patent No.: US 12,517,638 B2
(45) Date of Patent: Jan. 6, 2026

(54) METHOD AND DEVICE FOR ERASING HANDWRITING, INTERACTIVE BOARD AND STORAGE MEDIUM

(71) Applicants: GUANGZHOU SHIYUAN ELECTRONICS CO., LTD., Guangzhou (CN); GUANGZHOU SHIRUI ELECTRONICS CO. LTD., Guangzhou (CN)

(72) Inventor: Dexi Lin, Guangzhou (CN)

(73) Assignees: GUANGZHOU SHIYUAN ELECTRONICS CO., LTD., Guangzhou (CN); GUANGZHOU SHIRUI ELECTRONICS CO. LTD., Guangzhou (CN)

( * ) Notice: Subject to any disclaimer, the term of this patent is extended or adjusted under 35 U.S.C. 154(b) by 218 days.

(21) Appl. No.: 18/370,253

(22) Filed: Sep. 19, 2023

(65) Prior Publication Data

US 2024/0004537 A1    Jan. 4, 2024

Related U.S. Application Data

(63) Continuation of application No. PCT/CN2021/122843, filed on Oct. 9, 2021.

(30) Foreign Application Priority Data

May 20, 2021  (CN) .......................... 202110554083.9

(51) Int. Cl.
  *G06F 3/048*     (2013.01)
  *G06F 3/04845*   (2022.01)
  *G06F 3/04883*   (2022.01)

(52) U.S. Cl.
  CPC ...... *G06F 3/04845* (2013.01); *G06F 3/04883* (2013.01)

(58) Field of Classification Search
  None
  See application file for complete search history.

(56) References Cited

U.S. PATENT DOCUMENTS

| 2010/0181121 | A1  | 7/2010 | Tremblay |          |
|--------------|-----|--------|----------|----------|
| 2011/0199297 | A1* | 8/2011 | Antonyuk | .......... G06V 30/1423 345/157 |

(Continued)

FOREIGN PATENT DOCUMENTS

| CN | 101178632 A | 5/2008 |
| CN | 102906677 A | 1/2013 |

(Continued)

OTHER PUBLICATIONS

International Search report and Written Opinion received for PCT Patent Application No. PCT/CN2021/122843, mailed on Feb. 17, 2022, 19 pages including English translation.
Notice of Reasons for Refusal received for Japanese Patent Application No. 2023-545828, mailed on May 30, 2024, 6 pages including English translation.

(Continued)

*Primary Examiner* — Tuan S Nguyen
(74) *Attorney, Agent, or Firm* — Zhong Law, LLC

(57) ABSTRACT

A touch frame equipped on the interactive board has a touch response precision within a set precision range, including displaying, using a display screen, a display interface containing handwriting to be erased; receiving a handwriting erasing instruction and entering into a handwriting erasing mode, and the handwriting erasing instruction is generated by a user touch action; acquiring touch point information fed back through the touch frame when a touch object touches a surface of the display screen and moves on the surface, and the touch object is manipulated by the user; erasing the handwriting to be erased in the interface along an erasing geometry shape matching the touch object based on an analysis of the acquired touch point information and the handwriting to be erased.

19 Claims, 16 Drawing Sheets

(56) References Cited

U.S. PATENT DOCUMENTS

| | | | | |
|---|---|---|---|---|
| 2016/0239111 | A1* | 8/2016 | Zaitsev | G06F 3/03545 |
| 2017/0109917 | A1* | 4/2017 | Wang | G06T 11/203 |
| 2017/0255378 | A1* | 9/2017 | Desai | G06F 3/04883 |
| 2018/0181231 | A1* | 6/2018 | Ishikura | G06F 3/0488 |
| 2021/0081700 | A1* | 3/2021 | Usuki | G06F 3/04847 |
| 2022/0300092 | A1* | 9/2022 | Kamiyama | G06F 3/03545 |
| 2022/0350462 | A1* | 11/2022 | Lei | G06F 3/04883 |

FOREIGN PATENT DOCUMENTS

| | | | |
|---|---|---|---|
| CN | 104484121 | A | 4/2015 |
| CN | 108733296 | A | 11/2018 |
| CN | 109597528 | A | 4/2019 |
| CN | 109643211 | A | 4/2019 |
| CN | 209281365 | U | 8/2019 |
| JP | 2017049904 | A | 3/2017 |
| JP | 2020061193 | A | 4/2020 |
| WO | 2020095710 | A1 | 5/2020 |

OTHER PUBLICATIONS

First Office Action received for Chinese Application No. 202110554083.9, dated Jun. 28, 2025.
Search report received for Chinese Application No. 202110554083.9, dated Jun. 25, 2025.
Request for the Submission of an Opinion received for Korean Application No. 10-2023-7021725, dated Jun. 28, 2025.
European search report received for EP Application No. 21940459.7, dated Oct. 14, 2024.

\* cited by examiner

US 12,517,638 B2

METHOD AND DEVICE FOR ERASING HANDWRITING, INTERACTIVE BOARD AND STORAGE MEDIUM

CROSS-REFERENCE TO RELATED APPLICATIONS

This application is a continuation of PCT/CN2021/122843, filed on Oct. 9, 2021, which claims priority benefit from Chinese patent application No. 202110554083.9, filed with China National Intellectual Property Administration on May 20, 2021. The contents of the above-mentioned applications are herein incorporated by reference in their entireties.

TECHNICAL FIELD

The present disclosure relates to the field of touch writing of electronic equipment, and in particular to a method and device for erasing handwriting, interactive board and storage medium.

BACKGROUND

A touch frame is an important hardware component of an interactive board, which is mainly used for responding to a touch operation by a user on the interactive board. Most of the touch frames deployed in the interactive boards on the market are non-high-precision touch frames. The deficiencies of this type of non-high-precision touch frames are primarily manifested in the following: it is difficult to determine the type of stylus; it is difficult to ensure that the same touch area be generated by the same stylus during writing; it is difficult to determine whether the touch medium is a stylus or a finger or an eraser; it is also difficult to determine a touch rotation angle.

In the process of implementing the present disclosure, applicants found that there are the following deficiencies in current technologies: it is difficult to maximize the use of the touch point information fed back by the touch frame in the software layer, resulting in very little improvement for the performance related to touch on the interactive board (such as for the erasing effect when the formed handwriting is erased).

SUMMARY

The embodiments of the present disclosure provide a method and device for erasing handwriting, an interactive board and a storage medium, so as to improve the effect of handwriting erasing on the interactive board.

According to a first aspect of the present disclosure, a method for erasing handwriting for an interactive board is provided, and a touch frame equipped on the interactive board to achieve a touch response precision within a set precision range, and the method includes:

displaying, using a display screen, a display interface containing handwriting to be erased;

receiving a handwriting erasing instruction and entering into a handwriting erasing mode, wherein the handwriting erasing instruction is generated by a user touch action;

acquiring touch point information fed back through the touch frame when a touch object touches a surface of the display screen and moves on the surface, wherein the touch object is manipulated by the user; and erasing the handwriting to be erased in the interface along an erasing geometry shape matching the touch object based on an analysis of the acquired touch point information and the handwriting to be erased;

wherein the erasing geometry shape matching the touch object is represented by a touch area of the touch object acting on the display screen; and the erasing geometry shape includes a rounded rectangle, a circle and an arbitrary irregular shape.

Further, the acquiring the touch point information fed back through the touch frame includes:

recognizing respective touch signals through a hardware circuit in the touch frame, wherein the touch signal is generated responsive to a movement by the touch object on the display screen; and acquiring the touch point information fed back by the touch frame for each of the touch signals through a human interface device (HID) standard protocol;

wherein one touch point information corresponds to one touch point, and the touch point information includes: coordinates of a touch point, a touch height and width, and a touch rotation angle.

Further, after acquiring the touch point information fed back through the touch frame, the method for erasing the handwriting further includes:

processing respective touch point information, so that each touch point information has a unified unit format and data structure.

Further, the processing each touch point information includes:

converting a unit of each data information in the touch point information into a unified setting unit format based on acquired size information of the touch frame and screen resolution information; and recording the touch point information through a data structure corresponding to the set unit format.

Further, the erasing the handwriting to be erased in the interface along the erasing geometry shape matching the touch object based on an analysis of the acquired touch point information and the handwriting to be erased includes:

determining an erasing geometry shape matching the touch object during the touch object moving based on the acquired touch point information, and determining a moving contour geometry formed by a pair of adjacent touch points during the touch object moving under the erasing geometry shape;

analyzing respective handwriting points included in the handwriting to be erased, performing a hit test between each of the handwriting points and the moving contour geometry to determine target handwriting to be erased that falls within the moving contour geometry; and erasing the target handwriting to be erased in the display interface.

Furthermore, the determining an erasing geometry shape matching the touch object during the touch object moving based on the obtained touch point information, and determining a moving contour geometry formed by a pair of adjacent touch points during the touch object moving under the erasing geometry shape includes:

extracting principal touch point information and acquiring a principal touch area of the principal touch point information, wherein the principal touch point information is the touch point information generated by the touch object first contacting with the display screen during movement of the touch object;

determining an area threshold range and an area shape to which the principal touch area belongs, searching a target shape matching the area shape among geometry shapes corresponding to the area threshold range, and determining the target shape as an erasing geometry shape matching the touch object;

determining principal geometry information about each touch point in the pair of adjacent touch points with respect to an erasing geometry shape based on an analysis of the touch point information corresponding to the pair of adjacent touch points for each pair of adjacent touch points of the touch object during the touch object moving; and determining the moving contour geometry formed by the pair of adjacent touch points with respect to the erasing geometry shape based on the principal geometry information.

Further, when the erasing geometry shape is a rounded rectangle, the rounded rectangle includes a rectangle and rounded corners with each vertex of the rectangle as a circle center.

The determining principal geometry information about each touch point in the pair of adjacent touch points with respect to the erasing geometry shape based on an analysis of the touch point information corresponding to the pair of adjacent touch points further includes:

recording the rounded rectangle as a first geometry to be constructed of each touch point in the pair of adjacent touch points;

determining, for each touch point in the pair of adjacent touch points, coordinates of a center point of the rectangle in the first geometry to be constructed, coordinates of the circle center of each rounded corner, coordinates of each principal tangent point, and coordinates of a connection point of the two graphics through coordinates of touch points, a touch width, a touch height, and a touch rotation angle in the corresponding touch point information in combination with a radius of a predetermined rounded corner; and taking the coordinates of the center point of the rectangle, coordinates of the circle center of each rounded corner, the coordinates of each principal tangent point, and the coordinates of the connection point of the two graphics as the principal geometry information of the touch point with respect to the first geometry to be constructed;

wherein each rounded corner in the first geometry to be constructed includes two principal tangent points. Each principal tangent point is a corresponding tangent point when the rounded corner is connected with an adjacent rounded corner by a tangent line.

Further, the determining the moving contour geometry formed by the pair of adjacent touch points under the erasing geometry shape based on the principal geometry information includes:

extracting the coordinates of the circle centers of the rounded corners of the corresponding rounded rectangle from the principal geometry information of the pair of adjacent touch points, and selecting the principal center point required for constructing bounding contour;

acquiring principal circular regions respectively determined based on each of the principal center points;

extracting coordinates of rectangle vertex and the coordinates of the center point of the corresponding rounded rectangle from the principal geometry information of the pair of adjacent touch points, and selecting a pair of principal connection points required for constructing bounding contour;

acquiring bounding rectangle regions respectively determined based on each pair of principal connection points, and a vertex-connected enclosed region determined based on the coordinates of respective rectangle vertexes; and combining each of the principal circular regions, each of the bounding rectangle regions, and the vertex-connected enclosed region to form a first moving contour geometry constructed by the pair of adjacent touch points with respect to the rounded rectangle.

Further, the analyzing respective handwriting points included in the handwriting to be erased, performing the hit test between each of the handwriting points and the moving contour geometry to determine target handwriting to be erased that falls within the moving contour geometry includes:

disassembling the first moving contour geometry to acquire the vertex-connected enclosed region, a corresponding number of bounding rectangle regions and principal circular regions;

performing a first hit test between the handwriting point and the vertex-connected enclosed region as well as each of the bounding rectangle regions for each handwriting point included in the handwriting to be erased;

if the first hit test is successful, adding the handwriting point to a first set of target points; otherwise, performing a second hit test between the handwriting point and each of the principal circular regions;

if the second hit test is successful, adding the handwriting point to the first set of target points; and determining the handwriting formed based on respective handwriting points among the first set of target points as the target handwriting to be erased that falls within the moving contour geometry.

Further, the performing the first hit test between the handwriting point and each of the bounding rectangle regions includes:

combining the vertex-connected enclosed region with each of the bounding rectangle regions to acquire a corresponding convex polygonal region, and acquire vertexes of respective regions for constructing the convex polygonal region;

connecting the handwriting points to the vertexes of respective regions, and acquiring a same number of triangles as the vertexes of the regions;

determining an angle value of the vertex angle constructed by the handwriting points in each of the triangles; and if a sum of the angle values is 360 degrees, determining that the first hit test for the handwriting point is successful.

Further, the performing second hit test between the handwriting point and each of the principal circular regions includes:

acquiring a circle center and a radius of each of the principal circular regions, and determining a linear distance between the handwriting point and each of the circle centers; and if there is a linear distance smaller than the corresponding radius, determining that the second hit test for the handwriting point is successful.

Further, after the determining an erasing geometry shape matching the touch object during the touch object moving based on the acquired touch point information, the method for erasing the handwriting further includes:

responsive to determining that the erasing geometry shape is a rounded rectangle and monitoring that the touch object does not move within a set time, determining a corresponding static touch point when the touch object contacts with the display screen within a set time;

determining a static rounded rectangle with respect to the static touch point based on the touch point information of the static touch point; and performing a hit test and each handwriting point included in the handwriting to be erased between the static rounded rectangle, and erasing the handwriting to be erased that falls within the static rounded rectangle in the interface.

Further, the static rounded rectangle includes two static rectangular regions and four static circular regions;

correspondingly, the performing the hit test between each handwriting point included in the handwriting to be erased and the static rounded rectangle, and erasing the handwriting to be erased that falls within the static rounded rectangle in the interface includes:

performing the hit test and the handwriting point and two static rectangular regions as well as four circular regions respectively for each handwriting point in the handwriting to be erased;

when the handwriting point satisfies a success condition of the hit, adding the handwriting point into a set of static points; and erasing the handwriting formed based on respective handwriting points in the set of static points.

Further, when the erasing geometry shape is a circle, the determining principal geometry information with respect to the erasing geometry shape in the pair of adjacent touch points based on an analysis of the touch point information corresponding to the pair of adjacent touch points includes:

recording the circle as the second geometry to be constructed of each touch point in the pair of adjacent touch points;

determining coordinates of the circle center and coordinates of principal intersection point of the corresponding second geometry to be constructed based on the coordinates of the touch point, the touch width, and the touch height in the touch point information corresponding to each touch point in the pair of adjacent touch points; and denoting coordinates of the circle center corresponding to each touch point and the coordinates of each principal intersection point as principal geometry information with respect to the second geometry to be constructed.

Further, the determining coordinates of the circle center and the coordinates of the principal intersection point of the corresponding second geometry to be constructed based on the coordinates of the touch point, the touch width, and the touch height in the touch point information corresponding to each touch point in the pair of adjacent touch points includes:

determining coordinates of the circle center corresponding to the second circle to be constructed through the coordinates of the touch point, the touch width and the touch height in the touch point information corresponding to each touch point in the pair of adjacent touch points;

connecting the coordinates of corresponding two circle centers, and acquiring a line connecting the two circle centers; and constructing respectively straight lines perpendicular to the line connecting the two circle centers through the coordinates of circle centers, and acquiring the coordinates of the principal intersection point between each straight line and the corresponding second circle to be constructed.

Further, the determining the moving contour geometry formed by the pair of adjacent touch points under the erasing geometry shape based on the principal geometry information includes:

extracting the coordinates of the circle center from the principal geometry information of the adjacent touch points;

acquiring the second geometry region to be constructed determined based on the coordinates of respective circle centers;

extracting the coordinates of the respective principal intersection points from the principal geometry information of the adjacent touch points;

acquiring a connection region of principal intersection points determined based on the coordinates of each of the principal intersection points; and combining each of the second geometries to be constructed with the connection region of the principal intersection points, and forming a second moving contour geometry constructed by the pair of adjacent touch points with respect to the circle.

Further, the analyzing respective handwriting points included in the handwriting to be erased, performing a hit test between each of the handwriting points and the moving contour geometry to determine that target handwriting to be erased falls within the moving contour geometry includes:

disassembling the second moving contour geometry to acquire one connection region of principal intersection points and two second geometries to be constructed;

performing a third hit test between the handwriting point and the connection region of the principal intersection points for each handwriting point included in the handwriting to be erased;

if the third hit test is successful, adding the handwriting point to a second set of target points; otherwise, performing a fourth hit test between the handwriting point and each of the second geometries to be constructed;

when the fourth hit test is successful, adding the handwriting point to the second set of target points; and determining the handwriting formed based on respective handwriting points in the second set of target points as the target handwriting to be erased falling within the moving contour geometry.

Further, the performing a third hit test between the handwriting point and the connection region of the principal intersection points includes:

if determining that the connection region of principal intersection points is a rectangular region, selecting side vectors of two rectangles formed by a vertex from the rectangular region, and performing the hit test between the handwriting point and the rectangular region by comparing the handwriting point with each of the side vectors; otherwise, determining side vectors to be compared based on each vertex in the connection region of principal intersection points, wherein the number of side vectors to be compared is the same as that of the vertexes; and performing the hit test between the handwriting point and the rectangular region by comparing the handwriting point with each of the side vectors to be compared.

Further, when the erasing geometry shape is an arbitrary irregular shape, the determining principal geometry information about each touch point in the pair of adjacent touch points with respect to an erasing geometry shape based on an analysis of the touch point information corresponding to the pair of adjacent touch points for each pair of adjacent touch points of the touch object during the touch object moving includes:

recording the arbitrary irregular shape as a third geometry to be constructed of each touch point in the pair of adjacent touch points, and determining information of combined graphics contained in the third geometry to be constructed;

determining, for each touch point in the pair of adjacent touch points, a principal tracing point existing on the third geometry to be constructed with respect to the touch point and graphic representation information of the third geometry to be constructed by combining the information of the corresponding touch point with the information of combined graphics; and denoting the graphic representation information of respective combined graphics and respective principal tracing points as principal geometry information of the touch point with respect to the third geometry to be constructed.

Further, by combining the information of the corresponding touch point with the information of combined graphics, determining the principal tracing point existing on the third geometry to be constructed with respect to the touch point and the graphic representation information of the third geometry to be constructed includes:

analyzing the information of combined graphics;

responsive to determining that the third geometry to be constructed includes exclusively a polygon, determining the principal tracing point of the polygon with respect to the touch point through the corresponding touch point information, and acquiring first graphical representation information representing the polygon; and responsive to determining that the third geometry to be constructed includes a polygon and a target circle, determining a principal tracing point from the polygon and a principal circle through the corresponding touch point information, and acquiring second graphical representation information representing the polygon and the principal circle.

Further, the determining the principal tracing point of the polygon with respect to the touch point through the corresponding touch point information, and acquiring first graphical representation information representing the polygon includes:

determining coordinates of center points of sides of the polygon and coordinates of the vertexes of the sides of the polygon as the first graphic representation information through the coordinates of the touch point, the touch height and the touch width in the corresponding touch point information; and based on the coordinates of the center points of the sides of the polygon and the corresponding touch point information, selecting the principal tracing points satisfying a tracing point filtering condition from the coordinates of the vertexes of the sides of the polygon.

Further, the determining the principal tracing point from the polygon and the principal circle through the corresponding touch point information, and acquiring second graphical representation information representing the polygon and the principal circle includes:

through the coordinates of the touch point, the touch height and the touch width in the corresponding touch point information, determining the coordinates of center points of sides of the polygon and the coordinates of the vertex of the sides of the polygon, as well as the coordinate and a circle radius of the center point of the principal circle, and taking them as the second graphic representation information; and selecting the principal tracing points satisfying a tracing point filtering condition from the circumference of the principal circle and the coordinates of the vertexes of the sides of the polygon based on the coordinates of the center point of sides of the polygon, the coordinates of the center point, the radius of the circle, and the corresponding touch point information.

Further, the determining the moving contour geometry formed by the pair of adjacent touch points with respect to the erasing geometry shape based on the principal geometry information includes:

extracting the first graphical representation information or the second graphical representation information from the principal geometry information of the pair of adjacent touch points;

acquiring combined geometry respectively determined based on the corresponding first graphical representation information or the second graphical representation information;

extracting the principal tracing point from the principal geometry information of the pair of adjacent touch points;

acquiring a principal track region formed by connecting each of the principal tracing points; and combining each of the combined geometries with the principal track region to form a third moving contour geometry constructed by the pair of adjacent touch points with respect to the arbitrary irregular shape.

Further, the analyzing respective handwriting points included in the handwriting to be erased, performing the hit test between each of the handwriting points and the moving contour geometry to determine target handwriting to be erased falling within the moving contour geometry includes:

disassembling the third moving contour geometry to acquire the principal track region and each combined geometry;

for each handwriting point included in the handwriting to be erased, when the combined geometry includes exclusively a polygon, performing a corner hit test between the handwriting point and each of the polygons by using a corner method; or, when the combined geometries include a polygon and a principal circle, performing a distance hit test between the handwriting point and each of the polygons as well as the principal circle by using a distance method;

if the corner or distance hit test is successful, adding the handwriting point to a third set of target points; otherwise, performing a vector hit test between the handwriting point and the principal track region, and when the vector hit test is successful, adding the handwriting point to the third set of target points; and determining the handwriting formed based on respective handwriting points in the third set of target points as the target handwriting to be erased that falls within the moving contour geometry.

According to a second aspect of the present disclosure, a device for erasing handwriting is provided. The device is configured on an interactive board and includes a touch frame equipped on the interactive board to achieve a touch response precision within a set precision range. The device includes:

a display module, configured to display a display interface containing handwriting to be erased through a display screen;

a triggering module, configured to receive a handwriting erasing instruction, wherein if the device enter into a handwriting erasing mode, the handwriting erasing instruction is generated by a user touch action;

an acquiring module, configured to acquire touch point information fed back through the touch frame when a touch object touches the surface of the display screen and moves on the surface, wherein the touch object is manipulated by the user; and an erasing module, configured to erase the handwriting to be erased in the interface along an erasing geometry shape matching the touch object based on an analysis of the acquired touch point information and the handwriting to be erased.

According to a third aspect of the present disclosure, an interactive board is further provided, including:

a touch frame, having a touch response precision within a set precision range, configured to respond to a touch operation of a touch object through a hardware circuit included in the touch frame;

a display screen, configured to be covered by the touch frame to form a touch screen for displaying an interactive content;

one or more processors; and a memory device configured to store one or more programs;

wherein the one or more programs, when executed by the one or more processors, causes the one or more processors to perform the method according to the first aspect of the present disclosure.

According to a fourth aspect of the present disclosure, a storage medium is further provided, which stores computer executable instructions. The computer executable instructions are used to execute the method according to the embodiments of the present disclosure when executed by a computer processor.

The method and device for erasing the handwriting, interactive board and storage medium is provided above. The proposed method may be executed by an interactive board, and the touch response precision of the touch frame equipped on the interactive board reaches the set precision range. The method may first display a display interface containing handwriting to be erased through a display screen; and then may receive a handwriting erasing instruction, enter into a handwriting erasing mode; and then acquire touch point information fed back through the touch frame when a touch object touches a surface of the display screen and moves on the surface; and finally, erase the handwriting to be erased in the interface along an erasing geometry shape matching the touch object based on analysis of the acquired touch point information and the handwriting to be erased. For the above-mentioned technical solution of this embodiment, for an interactive board configured with a high-precision touch frame on the hardware structure, the configured high-precision touch frame may be optimized by the method according to this embodiment at the software application level. For an interactive board in the current technology that has not been optimized at the software level, the method according to this embodiment can ensure that the erasing response to the handwriting to be erased in the interface can better match the erasing geometry shape of the touch object used by the user, so that the flexible adjustment of the erasing region during the erasing process is realized, thereby improving the erasing efficiency on the interactive board.

BRIEF DESCRIPTION OF THE DRAWINGS

FIGS. 20-2q are relevant schematic diagrams determined by the principal geometry information when the erasing geometry shape is any irregular shape and includes exclusively polyline geometry in the method for erasing the handwriting according to Embodiment 2 of the present disclosure.

DESCRIPTION OF THE PREFERRED EMBODIMENTS

Figure 1:
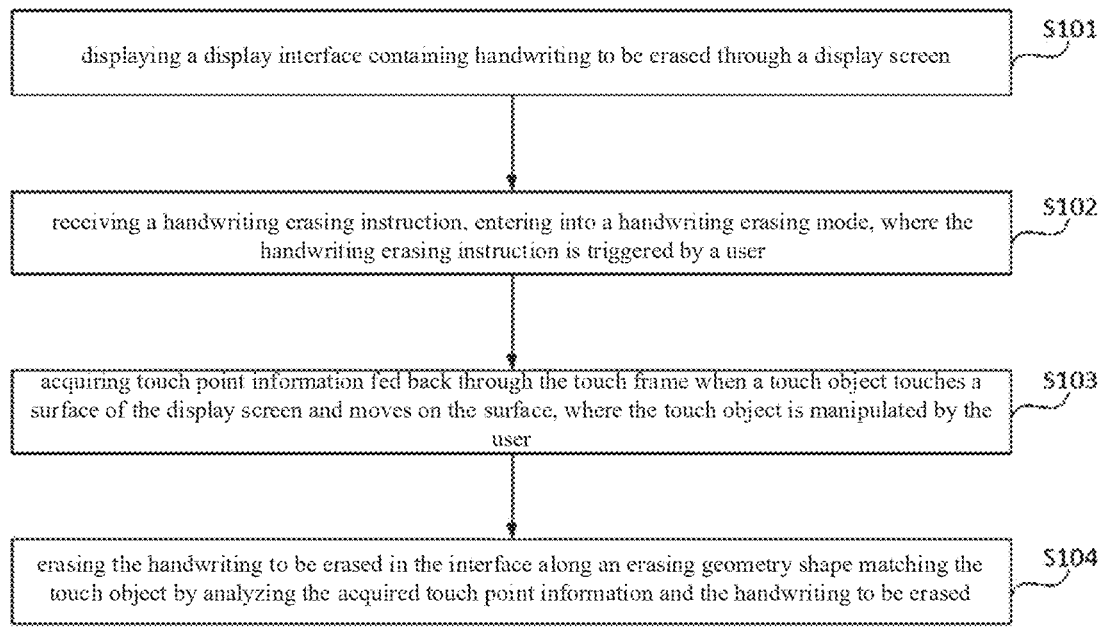
FIG. 1 is a schematic flowchart of a method for erasing handwriting according to Embodiment 1 of the present disclosure.

The following may provide a detailed description of embodiments of the present disclosure in conjunction with the accompanying drawings.

To make the purpose, technical solutions and advantages of the present disclosure clearer, embodiments of the present disclosure may be further described in detail below in conjunction with the accompanying drawings. It may be clear that the described embodiments are some of the embodiments of the present disclosure, not all of the embodiments. Based on the embodiments in the present disclosure, all other embodiments obtained by those skilled in the art without creative efforts fall within the claimed scope of the present disclosure.

In the description of the present disclosure, it may be understood that the terms "first", "second", "third" and the like are used to distinguish similar objects, and may not be used to describe a specific order or sequence, Neither may it be construed as indicating or implying relative importance. Those skilled in the art may understand the specific meanings of the above terms in the present disclosure according to specific situations. In addition, in the description of the present disclosure, unless otherwise specified, "plurality" means two or more. "And/or" describes the association relationship of associated objects, indicating that there may be three types of relationships, for example, A and/or B may indicate: A exists alone, A and B exist simultaneously, and B exists independently. The character "/" generally indicates that the contextual objects are an "or" relationship.

In practical applications, a hardware part of the interactive board is composed of a display screen, an intelligent processing system and other parts, which are combined by integral structural parts and supported by dedicated software systems.

The display screen may optionally include a Light Emitting Diode (LED) display screen, an Organic Light-Emitting Diode (OLED) display screen, a Liquid Crystal Display (LCD) display screen, and the like. By arranging optical touch sensors on both sides of the surface of the display screen, a touch frame may be formed to form a touch display screen. The optical touch sensor constituting the touch frame may scan a touch object, such as a finger of a user, a stylus, etc., on a surface of the display screen using light signals. It may be understood that to protect the display screen from being scratched by touch objects, a cover glass is provided on the surface of the display screen. Therefore, in the embodiments of this specification, the surface of the display screen refers to a glass surface of a cover plate of the display screen.

When the touch object touches the display screen and triggers an interface on the display screen to perform positioning and other operations, the touch frame may respond to the above touch operations and pass corresponding touch operation information to an intelligent processing system at an application level, so that various interactive applications are implemented through an intelligent processing system.

Taking an optical touch sensor that construes the touch frame as an example, the touch frame is explained from the perspective of technical principles.

Alternatively, the optical touch sensor may include an infrared emitter and an infrared receiver. The infrared emitter is configured to emit an infrared signal, and the infrared receiver is configured to receive an infrared signal. The densely distributed infrared signals in different directions are used to form a beam grid to locate the touch point. The display screen is equipped with a frame having a circuit board, which is configured to arrange infrared emitters and infrared receivers around the display screen to form a horizontal and vertical beam grid touch frame.

When the display screen is equipped with the above-mentioned touch frame, if the touch object blocks the infrared signal, a light measurement value may be weakened at the corresponding infrared receiver, so the position of the touch point on the screen may be determined.

Alternatively, the infrared transmitter is installed on a first side of the frame of the display screen, the infrared receiver is installed on a second side of the frame of the display screen, and the first side is opposite to the second side, that is, the infrared receiver is arranged within a scanning range of the infrared transmitter, so that the infrared signal emitted by the infrared transmitter is received by the infrared receiver.

According to different business requirements, the shape of the display screen is different, such as rectangle, hexagon, circle, etc., and the shape of the frame also varies with the shape of the display screen, such as rectangle, hexagon, circle, etc. For frames of different shapes, the settings of infrared emitters and infrared receivers in each infrared module are also different.

Generally, when a conventional touch frame configured on the interactive board responds to the touch signal of the touching object, the touch response precision possessed is usually within a conventional range. For a non-high-precision touch frame whose touch response precision is in the conventional range, it may be difficult to recognize a touch area of the touch object on the display screen. Therefore, in a touch writing mode, it is difficult to determine what type of touch object the user uses to write and what touch medium (finger, stylus) the user uses to erase. The erasing is carried out exclusively based on the conventional erasing form. At the same time, it is difficult for a non-high-precision touch frame to ensure that the same type of touch object presents the same touch area during the touch process.

In terms of the hardware configuration of the interactive board in this embodiment, compared with the conventional touch frame whose touch response precision is within the conventional range, the touch frame preferably adopts a high-precision touch frame with high touch response precision. High touch response precision may be understood as the touch response precision has reached a set precision range, wherein a precision limit of the set precision range is higher than the conventional precision range. Through the touch frame adopted in this embodiment, more detailed touch information may be provided to an upper-layer application level. For example, a touch area of the touch object, more an accurate coordinate of the touch point, and a rotation angle of the touch object during a touch process. etc. may be provided.

At the same time, the intelligent processing system in the interactive whiteboard may include a host processor, which belongs to a processor of the interactive board. Software embedded in the host processor may achieve different functional applications, utilizing the display screen to display images and create dynamic audio and video effects.

The host processor is a computing module with higher performance.

For example, the host processor may be Android module. Android system may be installed, and Central Processing Unit (CPU), Graphics Processing Unit (GPU), random access memory (RAM) and Read-Only Memory (ROM) and other components may be configured, for example, for Android7.0 version, CPU is dual-core A72 and quad-core A53, GPU is Mali T860, RAM is 4 GB, ROM is 32 GB, etc.

For another example, the host processor may be a personal computer (PC) module configured with components such as CPU, GPU, a memory, and a hard disk. For example, for a plug-in Intel Core series modular computer, CPU is Intel Core i5/i7, GPU is Intel HD Graphics, the memory is DDR4 8G/16G, and the hard disk is 128G/256G.

Embodiment 1

FIG. 1 is a schematic flowchart of a method for erasing handwriting according to Embodiment 1 of the present disclosure. This embodiment is applicable to a situation of erasing handwriting existing in an interface in an erasing mode. The method may be executed by a device for erasing handwriting, which may be implemented by software and/or hardware, and may be configured in an interactive board, especially in a processor of an interactive board, which may be a host processor in an intelligent processing system. At the same time, the touch response precision of the touch frame equipped in the interactive board reaches the set precision range. In addition, the touch frame is also electrically connected to the display screen.

As shown in FIG. 1, a method for erasing handwriting is provided according to Embodiment 1 of the present disclosure. The method alternatively includes the following steps:

S101, displaying, using a display screen, a display interface containing handwriting to be erased;

It can be known that an execution subject of the method provided according to this embodiment, that is, the interactive board is further provided with a graphics processing unit (GPU), which may provide a video processing function. Alternatively, GPU may receive processing information from the host computer, places the information into a frame memory, and generates serial display data and scanning control timing required by the display for the video signal based on the partition driving method. Based on the above operations, the display screen arranged on the interactive board may play frame data information based on the serial display data and scanning control timing, thereby displaying various pictures on the display screen.

In this embodiment, the display interface may be regarded as the interface displayed on the display screen after the user writes or edits in the writing or editing mode. Alternatively, element information presented on the display interface at least includes handwriting to be erased formed through the user operation. It can be known that the handwriting to be erased may be the handwriting presented by the user in the writing mode, wherein the color, thickness, etc. of the handwriting may be selected by the user, and the presented handwriting style may also show the writing style of the user.

Generally, the display interface may be an independent interface. For example, the interactive board provides an electronic whiteboard, and the user triggers a control operation to display the electronic whiteboard in the interactive board. The interactive board receives the control operation, displays the electronic whiteboard, and presents it as an element display interface.

In addition, the display interface may also be an interface with a background. Exemplarily, the interactive board displays data such as a screen image or a local courseware that is transmitted by the screen transfer device (USB Dongle), and belongs to a source device (such as a notebook computer, etc.). The user triggers an annotation operation on the interactive board, and the interactive board receives the annotation operation, freezes the data such as the courseware or the screen image, and makes it become the background, that is, maintains a current frame of displaying the courseware, the screen image, etc., and a mask layer is generated on the data such as the courseware, the screen image, etc., which serves as the currently presented display interface.

The so-called courseware may refer to a course document made according to a teaching requirement. The courseware may include steps such as determining teaching objectives, analyzing teaching content and tasks, designing a structure of teaching activities and an interface, etc. The courseware may take various forms, for example, the courseware may be Word documents, PPT (PowerPoint) and other public format files may also be custom pages composed of text, tables, pictures and other elements, which is not limited in this embodiment.

S102, receiving a handwriting erasing instruction and entering into a handwriting erasing mode, wherein the handwriting erasing instruction is generated by a user touch action.

In this embodiment, from the perspective of the user, the user may perform a touch triggering operation on the display screen, that is, on the presented display interface. The touch operation may be a point touch, a long press touch, or a mobile touch. The point touch is mostly used to trigger any button or icon in the display interface. The long pressed touch is mostly used for dragging elements, and a mobile touch is mostly used for writing or erasing handwriting. The mobile touch is commonly represented in the form of a track.

Generally, the control operations on the interactive board display interface include but are not limited to touch operations, keyboard operations, mouse operations, and physical button operations. In this embodiment, the operation of generating a handwriting erasing instruction may also be selected through a touch operation, a mouse operation, and a keyboard operation.

Exemplarily, a pre-operation of performing this step may be described as follows: the display interface includes a function button to enter the erasing mode, such as an erasing button, and the user performs a point touch on the erasing button, and the touch box in the interactive board responds to a touch signal of the touch operation, and feeds back the touch information related to the touch signal to the upper layer of the interactive board (such as the main processor in the intelligent processing system). Thus, this step may receive the handwriting erasing instruction generated by the upper layer, and enter into the handwriting erasing mode in response to the handwriting erasing instruction.

In this embodiment, the handwriting erasing mode may be understood as that the interactive whiteboard has an authority to erase elements displayed in the display interface after this mode is started. That is, after entering into the erasing mode, the handwriting presented in the writing mode on the display interface may be regarded as the erasing object, and has the authority to erase the erasing handwriting.

S103, acquiring touch point information fed back through the touch frame when a touch object touches a surface of the display screen and moves on the surface, wherein the touch object is manipulated by the user.

In this embodiment, the touch object may optionally be a finger of the user, an active stylus or a passive stylus, etc., and the user may manipulate the touch object to move on the display surface of the interactive board. When the touch object moves, the presented moving state may be used for erasing handwriting in the erasing mode. Exemplarily, the touch object during erasing may be a dedicated physical eraser (such as a touch blackboard eraser) that matches the interactive board, or it may be a body part of the user, such as a hand.

Taking the touch of the touch object on the display screen and information feedback, through the above description in the embodiment of the present disclosure, it can be known that the interactive board is further equipped with a touch frame combined with the display screen. The touch frame may optionally be composed of an optical touch sensor bezels nested at the edges of the display screen. In this step, the touch frame may generate a touch signal based on the included optical touch sensor when the touch object moves on the display screen, and recognize corresponding touch point information through a response to the touch signal.

Figure 1A:
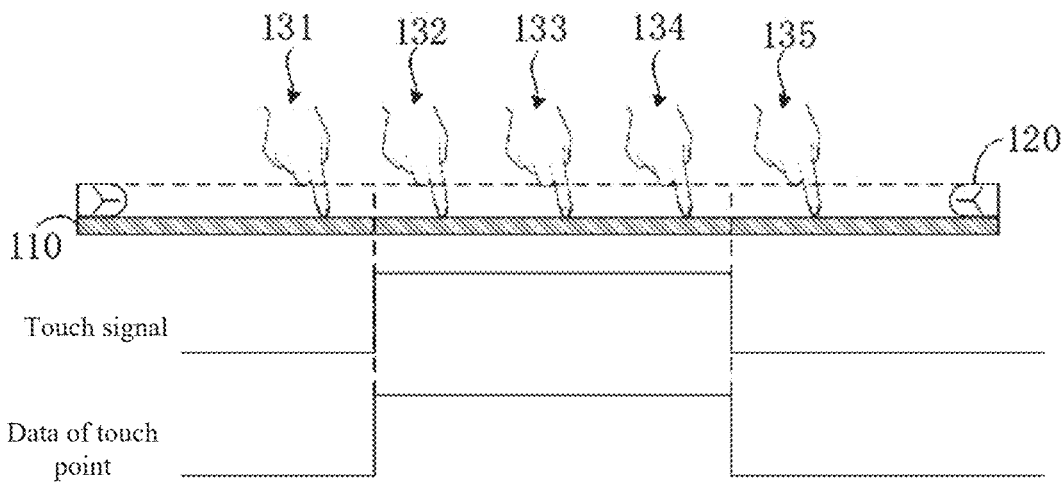
FIG. 1a is a diagram showing an effect of a touch frame responding to a touch object in a method for erasing handwriting according to Embodiment 1 of the present disclosure.

Alternatively, FIG. 1a a diagram showing an effect of a touch frame responding to a touch object in a method for erasing handwriting according to Embodiment 1 of the present disclosure. As shown in FIG. 1a, one or more optical touch sensors 120 are installed on both sides of the edge of the display screen 110 of the interactive board, constituting a touch frame. The moving state of the touch object manipulated by the user (for example, using the finger of the user as the touch object required for erasing) on the display screen 110 may be represented by finger states 131 to 135.

Following the above description, during the start-up and running of the interactive board, the processor may activate the optical touch sensor 120, and the optical touch sensor 120 scans the light signal on the display surface of the interactive board, and detects whether the display surface appears or not according to the transmission of the light signal. When the touch object is detected, a corresponding touch signal is generated in real time during the movement of the touch object. At the same time, the touch frame may respond to the generated touch signal, so as to feed back the touch point data recognized after the response to the upper layer of the interactive board (such as the main processor in the intelligent processing system). In this embodiment, the touch point data is recorded is the touch point information.

In this embodiment, considering that the touch response precision of the touch frame configured on the interactive board with respect to the touch object has reached the set precision range, it may be considered that the touch frame used in this embodiment is a high-precision touch frame. The touch point information fed back by the touch frame in the above steps is superior to the touch point information fed back by the conventional touch frame in terms of precision and information detail. Exemplarily, the touch point information that the touch frame feeds back to the upper layer of the interactive board includes at least the coordinates of the touch point, the height and width and the touch area of the touch point that at which the touch object generates the touch signal, corresponding touch rotation information when the touch object rotates, etc.

S104, erasing the handwriting to be erased in the interface along an erasing geometry shape matching the touch object based on an analysis of the acquired touch point information and the handwriting to be erased.

In this embodiment, based on an analysis of from the perspective of the user, the user touches to enter the erasing mode, it can be known that the user has the willingness to erase the elements in the display interface, and the elements that meet the erasing conditions may preferably be selected as handwriting generated by pre-writing of the user. In this embodiment, the handwriting displayed on the display interface is referred to as the handwriting to be erased.

It may be noted that, in the erasing implementation of the current technology, after the touch enters the erasing mode, the geometry shape of the eraser used for the erasing operation is often preset by the user, for example, it may be a circle or a rectangle. An erasing size may also be the same size as that of the eraser. In erasing of the current technology, the geometry shape of the eraser, especially the rotated form of the eraser and the size of the eraser may not change due to changes in the shape or size of the touched object, and often need to be set manually. Therefore, when erasing based on the erasing method of the current technology, there is a problem that erasing takes a long time since the size of the eraser is too small.

On the interactive board, if this embodiment wants to realize a personalized erasing of the handwriting of the user and improve an efficiency of handwriting erasing, it may acquire data information that may characterize the form of the touch object used by the user, and then through the data information processing, determine an erasing geometry shape that matches the touch object when erasing handwriting, and finally present the form and size of the eraser based on the determined erasing geometry shape, and erase the handwriting to be erased through the presented eraser, thereby realizing the diversification of the geometry shapes of the eraser in the handwriting erasing operation, and at the same time improving the erasing efficiency of the handwriting erasing operation.

It may be noted that the determination of the erasing geometry shape corresponding to the touch object mainly relies on the touch area of the touch point information. Touch areas of different sizes often correspond to different erasing geometry shapes, that is, the erasing geometry shape matching the touch object is reflected by the touch area of the touch object acting on the display screen. In this embodiment, the geometry matching the touch area may be determined through the analysis of the touch area in the touch point information, and the geometry are used as the erasing geometry shape corresponding to the touch object. The erasing geometry shape determined in this step may at least include three forms of circle, rounded rectangle and any irregular shape.

Exemplarily, the correspondence between the touch area and the erasing geometry shape is mainly determined based on the form and size of the touch area. For example, when the touch object is a finger, the touch area in the touch point information may actually represent the covered region touched by the finger, and the form of the touch area is close to a circle, so it may be considered that the erasing by using the touch object is to erase in a small region, so that a circle with an area equal to the touch area may be used as the erasing geometry shape of the touch object, and an eraser that presents the erasing geometry shape (circle) in the erasing mode may perform handwriting erasing.

As another example, when the touch object is the back of the hand, the touch area in the touch point information may actually represent the covered region touched by the back of the hand, and the form presented by the touch area is close to a quadrilateral with rounded corners, it is considered that the erasing performed by the touch object is a large-area erasing, so that a rounded rectangle with an area consistent with the area covered by the back of the hand may be regarded as the erasing geometry shape of the touch object.

For another example, when the touch object is a first wheel after the hand makes a first (that is, a position on the side of the little finger), the touch area in the touch point information may actually represent the covering region touched by the first wheel, and in this case, the form presented by touch area is more like a combination of two geometry, such as a polygon and a circle. Therefore, in this case, a combination of a polygon and a circle may be regarded as the geometry shape of the touch object. This combination may be considered as any irregular shape.

In this embodiment, the touch frame usually feeds back the touch point information in one collection cycle, and the fed back touch point information often includes the data information of the touch points corresponding to the touch signals received in the collection cycle. In the erasing mode, during the process of erasing handwriting through the movement of the touch object on the display screen, the touch object is always in contact with the display screen, that is, the touch object does not leave the display screen, and the interactive board may be used during this process. The interactive board may continuously erase the handwriting by moving the touch object. Therefore, under the above premise, when determining the erasing geometry shape of the touch object, the touch area in all the touch point information is not required, the touch point information of the touch point generated in response to a movement by the touch object contacts with the display screen for the first time is needed. that is, in the process that the touch object does not leave the display screen, one erasing geometry shape needs to be determined with respect to the touch object.

In this step, the optional implementation process of erasing the handwriting to be erased based on the determined erasing geometry shape is analyzed as follows. First, with respect to the touch point generated on the touch frame at a certain moment of the touch object, they may all present an eraser pattern that conforms to the geometry shape. Secondly, considering that the touch object moves on the display screen by touch, that is, the eraser pattern formed above is also discrete and continuously presented. Thereby, the connection of the presented eraser patterns may form a continuous geometric closed graphic, which is also equivalent to the moving contour geometry constructed after the touch object moves. Again, the formed moving contour geometry constructing the region to be erased on the display interface, and finally, each handwriting to be erased in the region to be erased may be determined, and erasure of these handwritings to be erased can be realized.

Figure 1B:
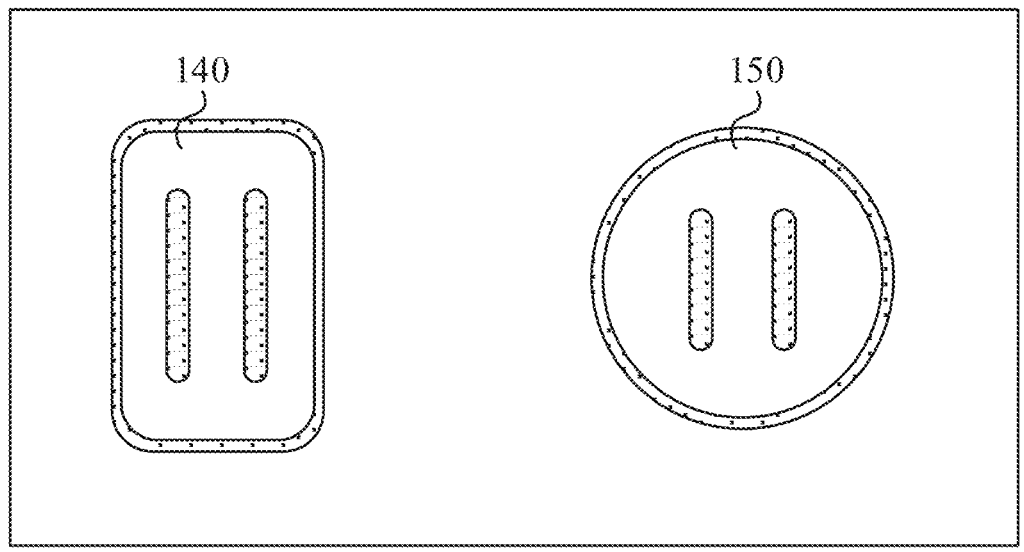
FIG. 1b is an effect diagram presented by an erasing geometry shape in the method for erasing the handwriting according to Embodiment 1 of the present disclosure.

For the eraser pattern presented in the erasing geometry shape, FIG. 1b shows an effect diagram presented by an erasing geometry shape in the method for erasing the handwriting according to Embodiment 1 of the present disclosure. As shown in FIG. 1b, FIG. 1b includes a first eraser pattern 140 presented as a rounded rectangle, and a second eraser pattern 150 presented as a circle.

Figure 1C:
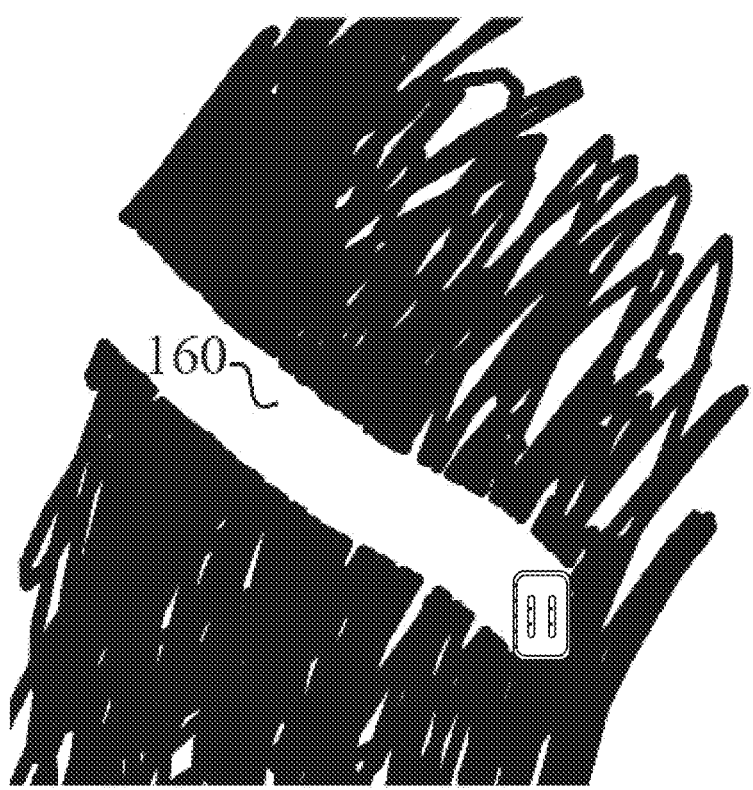
FIG. 1c is an effect diagram presented by a moving contour geometry as an erasing region in the method for erasing the handwriting according to Embodiment 1 of the present disclosure.

For the continuous geometric closed graphic formed during the movement of the touch object, FIG. 1c shows an effect diagram presented by a moving contour geometry as an erasing region in the method for erasing the handwriting according to Embodiment 1 of the present disclosure. As shown in FIG. 1c, FIG. 1c includes a moving contour geometry 160 formed when a rounded rectangle is used as the erasing geometry shape.

In the optional implementation of this step, it may construct the moving contour geometry during the movement of the touch object. Through analysis, it may be found that the continuous moving contour geometry is actually equivalent to the region formed by each touch point in the form of erasing geometry shape. Therefore, for the determination of the moving contour geometry, it is actually used to determine the graphic constructed by connecting the erased geometrical forms presented by two adjacent touch points. However, due to the different erasing geometry shapes, the formation methods of forming the moving contour geometry based on the adjacent erasing geometry shapes are also different. To perform the erasing operation normally, this step needs to respectively carry out the construction of the corresponding moving contour geometry.

For example, when the erasing geometry shape is a rounded rectangle, it needs to be realized through the contour construction method corresponding to the rounded rectangle. Alternatively, the graphical representation of two rounded rectangles may be determined, and then some points respectively selected from the two rounded rectangles are expanded and connected, and thus the closed region formed by these two rounded rectangles is constructed as the corresponding moving contour geometry under the rounded rectangle.

As another example, when the erasing geometry shape is a circle, it may be realized through the contour construction method corresponding to the circle. Alternatively, the graphical representation of two circles may be determined, and then two connection points are respectively selected from the two circles and are connected, and thus, the closed region formed based on these two circles is constructed as the corresponding moving contour geometry under the circle.

A method for erasing handwriting provided in Embodiment 1 of the present disclosure may be executed by an interactive board, and the touch response precision of the touch frame equipped on the interactive board reaches the set precision range. The method may first display a display interface containing handwriting to be erased through a display screen, and then acquire touch point information fed back through the touch frame when a touch object touches a surface of the display screen and moves on the surface, and finally, erase the handwriting to be erased in the interface along an erasing geometry shape matching the touch object based on an analysis of the acquired touch point information and the handwriting to be erased. An execution subject of the method, that is, the interactive board, is equipped with a high-precision touch frame on the hardware structure, and can realize the function optimization on the software application level of the configured high-precision touch frame through the method provided by this embodiment. As compared with an interactive board optimized at the software level in the current technology, the method provided in this embodiment can ensure that the erasing response to the handwriting to be erased in the interface can better match the erasing geometry shape of the touch object used by the user, thereby realizing flexible adjustment of the erasing region during the erasing process, and further improving the erasing efficiency on the interactive board.

As an optional embodiment of Embodiment 1 of the present disclosure, after the acquiring the touch point information fed back by the touch frame, the method for erasing the handwriting may further include: processing respective touch point information, so that each of the touch point information has a unified unit format and data structure.

It may be noted that in this embodiment, the presentation operation of handwriting is mainly performed by the intelligent processing system on the upper layer of the interactive board, alternatively, it may be executed by the host processor, and the touch point information required for the presentation of handwriting mainly fed back by the touch frame at the hardware level of the interactive board. In this embodiment, the touch point information fed back by the touch frame may be regarded as the input information required by the upper layer.

For the touch frame configured on the interactive board, if they come from different manufacturers, the execution parameters of the touch frames are also different, which may lead to differences in the representation of the touch information fed back by the touch frames, that normal execution of the method for erasing the handwriting is affected. To ensure the unification of data information in the execution process of handwriting presentation, the information processing operation proposed in this optional embodiment is added based on the first embodiment above.

Exemplarily, this optional embodiment may analyze the production information and batch information of the touch frame, determine the original information format of the touch point information fed back by the touch frame, and then process the unit format and data structure of the touch point information, so as to ensure that the data input to the upper layer of the interactive board has a unified information format. The processed touch point information removes the unit format related to the touch frame manufacturer or batch. For example, the touch area unit fed back in the touch point information in the original information format is basically based on the number of the blocked optical trigger sensors on the touch frame is used as a touch width unit and a touch height unit, which may be converted into an abstract unit in unified software, such as a pixel unit, in this optional embodiment.

Based on the above optimization, in this embodiment, the processing of each touch point information may be embodied as follows.

Based on the acquired size information of the touch frame and the screen resolution information, converting the unit of each data information in the touch point information into a unified set unit format; and using the data structure corresponding to the set unit format to record the touch point information.

In the implementation of this optional embodiment, to acquire more accurate data information from the inside of the touch frame, it may be used to know the size of the touch frame currently equipped on the interactive board and the screen resolution information of the display screen, etc., and these information may be respectively acquired by communicating with the touch frame hardware or reading from the intelligent processing system.

For the optional processing items of the touch point information, this optional embodiment may uniformly convert data information such as the coordinates of the touch point, the height and width of the touch point, or the vertexes of the geometry constructed when the touch frame is recognized in the original information format into more abstract unit values at the software level, such as coordinate points represented by pixels, width or height values, etc.

Similarly, another advantage of the high-precision touch frame is that the rotation operation of the touch object may also captured during the touch process, and the rotation angle of the touch rotation may be determined. At this time, through the processing method of this optional embodiment, the initially acquired rotation angle may also be processed in a unified radian unit.

The above optional embodiment of the first embodiment of the present disclosure alternatively adds the processing operation of the touch point information fed back by the touch frame. Through this processing operation, the unified input of the touch point information may be realized, avoiding the incompatibility of the touch point information in the subsequent execution process caused by the different attribute parameter information of the touch frame itself, thereby effectively improving the execution efficiency of handwriting erasing.

Embodiment 2

Figure 2:
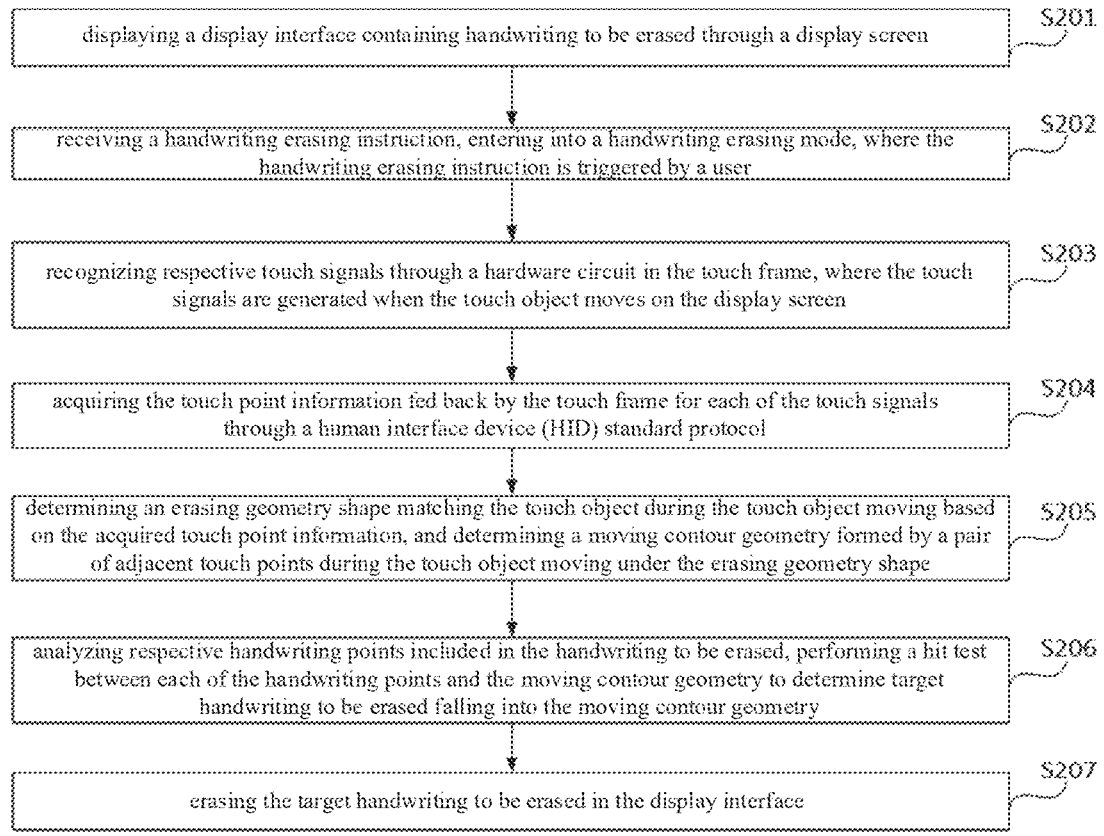
FIG. 2 is a schematic flowchart of a method for erasing handwriting according to Embodiment 2 of the present disclosure.

FIG. 2 is a schematic flowchart of a method for erasing handwriting according to Embodiment 2 of the present disclosure. This embodiment is optimized based on the above-mentioned embodiments. In this embodiment, the touch point information feedback through the touch frame may be optimized as follows. recognizing respective touch signals through a hardware circuit in the touch frame, wherein the touch signal is generated in response to a movement by the touch object on the display screen; acquiring the touch point information fed back by the touch frame for each of the touch signals through a human interface device (HID) standard protocol; wherein one touch point information corresponds to one touch point, and the touch point information includes: coordinates of a touch point, a touch height and width, and a touch rotation angle.

Moreover, this embodiment further optimizes the erasing the handwriting to be erased in the interface along the erasing geometry shape matching the touch object based on an analysis of the acquired touch point information and the handwriting to be erased as follows: determining an erasing geometry shape matching the touch object during the touch object moving based on the acquired touch point information, and determining a moving contour geometry formed by a pair of adjacent touch points during the touch object moving under the erasing geometry shape; analyzing respective handwriting points included in the handwriting to be erased, performing a hit test between each of the handwriting points and the moving contour geometry to determine target handwriting to be erased that falls within the moving contour geometry; and erasing the target handwriting to be erased in the display interface.

As shown in FIG. 2, a method for erasing handwriting provided according to Embodiment 2 of the present disclosure optionally includes the following operations.

S201, displaying, using a display screen, a display interface containing handwriting to be erased.

Exemplarily, it may be generated by the user touch action to enter into a display interface with elemental information such as handwriting, or it may be a display interface with elemental information such as handwriting to be erased generated in some related scenarios (such as a courseware display scene).

S202, receiving a handwriting erasing instruction and entering into a handwriting erasing mode. The handwriting erasing instruction is generated by a user touch action.

Exemplarily, the user may receive a handwriting erasing instruction by triggering an erasing button on the display interface, thereby entering into the handwriting erasing mode, so as to enable the authority to erase the handwriting in the display interface.

S203, recognizing respective touch signals through a hardware circuit in the touch frame. The touch signal is generated in response to a movement by the touch object on the display screen.

In this embodiment, the operation of the touch object touching the display screen and moving on it is analyzed from the perspective of the touch frame. alternatively, the optical touch sensor may be regarded as a core component constituting the touch frame. After the interactive board starts, runs, and controls the power of the optical touch sensor, the optical touch sensor (such as an infrared emitter arranged on one side and an infrared receiver arranged on the other side) may be arranged on the edge of the display screen in real time. Whether there is a touch object on the surface of the display screen is detected by using whether the beam grid formed by the densely distributed infrared signals in different directions is blocked or not.

If there is a touch object, a corresponding touch signal may be generated at the corresponding position when the touch object blocks the normally emitted infrared signal; after that, the hardware circuit arranged in the touch frame may recognize the touch signal, such as through recognition of the high and low levels of the touch signal to determine the coordinate information of the position of the touch signal represented by the data at the hardware level, the corresponding width information and height information when the touch object blocks the infusion grid, and even the touch area information and rotation information, etc. the touch object.

It may be understood that as the touch object moves on the display screen, a group of touch signals may be generated correspondingly, and the hardware circuit on the touch frame may effectively recognize the relevant touch information of each touch signal in the group, and at the same time, pressure sensitivity information of the touch object at each touch point may be determined through the pressure of the touch object acting on the hardware circuit of the touch frame.

S204, acquiring the touch point information fed back by the touch frame for each of the touch signals through a human interface device (HID) standard protocol.

From the above description, it can be known that, considering that the touch frame is a hardware structure on an interactive board, the touch point information recognized by the hardware circuit on the touch frame with respect to each touch point is difficult to directly input to the upper software processing module. Through this step, the special human interface device (HID) standard protocol may be used to acquire the readable touch point information at the software level after converting the touch point information recognized at the hardware level.

In the handwriting erasing operation realized based on this embodiment, information of each touch point fed back by the touch frame optionally represents a touch point generated by the touch object, and the required touch point information can at least include coordinates of a touch point, a touch height and width, and a touch rotation angle.

Alternatively, the coordinates of the touch point are the basic information of touch, the height and width of the touch point may be used to represent covering area of the touch signal generated by the touch object when the user controls the movement of the touch object, and the matching erasing geometry shape of the touch object may be determined through the above-mentioned information. Similarly, the touch rotation angle may represent the rotation information when the touch object rotates during the movement, and the rotation information may also be regarded as the basic information required for determining the moving contour geometry corresponding to the erasing geometry shape.

Through the above steps of this embodiment, the touch point information fed back by the touch frame may be acquired in real time during the movement of the touch object. Therefore, this embodiment may realize the erasing of the handwriting to be erased on the display interface through the following S205 to S207.

S205, determining an erasing geometry shape matching the touch object during the touch object moving based on the acquired touch point information, and determining a moving contour geometry formed by a pair of adjacent touch points during the touch object moving under the erasing geometry shape.

In this embodiment, this step optionally realizes the determination of two pieces of main information required in the erasing operation, one is the erasing geometry shape matching the touch object, and the other is the moving contour geometry that may be formed by two adjacent touch points determining under the erasing geometry shape.

According to the description in the above-mentioned embodiments, it can be seen that the determination of the erasing geometry shape may need to pay attention to the touch point information of the touch point generated in response to a movement by the touch object touches the display screen for the first time during the movement process. The touch area may determine the geometry shape that matches the touched area, so that the matched geometry shape may be used as the erasing geometry shape that may be displayed for this erasing.

Also, according to the description of the above-mentioned embodiment, it can be seen that the erasing geometry shape includes at least a rounded rectangle, a circle, and any irregular shape, and based on the fed-back touch point information of each touch point, each touch point may present an eraser pattern consistent with the erasing geometry shape, the eraser patterns of two adjacent touch points may be connected in a certain way, and the closed region formed by the connection may be regarded as the moving contour geometry corresponding to the two adjacent touch points.

Exemplarily, when the eraser patterns of two adjacent touch points are rounded rectangles, each rounded rectangle is equivalent to replacing several top corners of a rectangle with rounded corners, which may be considered as a rounded rectangle which at least includes the side lengths of rectangles and a portion of the arc of a circle.

For two rounded rectangles characterized by the above form, the principal points of each rounded rectangle may be obtained first, and then some connection points may be selected from the principal points of the two rounded rectangles and connected, and finally connected the region of the two rounded rectangles themselves and the closed region formed by the connection may be obtained, and the combination of the region of themselves and the closed region constructs a moving contour geometry corresponding to two adjacent touch points when the erasing geometry shape is a rounded rectangle.

In addition, when the geometry to be erased is a circle or any irregular shape, there is also a corresponding method for determining the moving contour geometric form. To sum up, no matter what kind of graphic the erased geometric shape is, it may first determine the graphical representation information of the graphic corresponding to the erased geometric form itself, and then select the connection points required to establish a connection based on the acquired graphical representation information, and so as to construct a closed combination region based on the connection points and the graphic corresponding to the erasing geometric forms themselves as the corresponding moving contour geometry.

It may be known that in this embodiment, a rounded rectangle and a circle may be considered as two special cases of any irregular shape. When these two special cases are determined for the moving contour geometry, they may not correspond to any irregular shape. However, there are other preferred determination schemes. Therefore, in this embodiment, the rounded rectangle and the circle are regarded as two independent forms of graphics that are different from any geometric combination image, and their respective corresponding determination scheme is used to determine the moving contour geometry.

S206, analyzing respective handwriting points included in the handwriting to be erased, performing a hit test between each of the handwriting points and the moving contour geometry to determine target handwriting to be erased that falls within the moving contour geometry.

The above S205 is equivalent to determining the region to be erased (moving contour geometry) with erasing authority that constructs when the touch object moves during the erasing operation. This step mainly realizes how to determine which handwriting in the display interface falls into the moving contour geometry. If there are handwritings that falls within the moving contour geometry, these handwritings may be considered as the current erasable handwritings, which are recorded as the target handwritings to be erased in this embodiment.

In this embodiment, the handwriting to be erased in the display interface may be understood as the content written by the user in the interface in a certain way in the writing or editing mode. These handwritings to be erased may also be characterized by corresponding handwriting information, and the principal information in the handwriting information is the coordinates of the handwriting points required to constitute these handwritings to be erased. This step may directly acquire the coordinates of the handwriting point of each handwriting point characterizing the handwriting.

In this step, the operation of determining which handwriting to be erased falls into the moving contour geometry may be converted into an operation of determining whether each handwriting point representing the handwriting to be erased falls in the moving contour geometry. The determination of whether the handwriting point falls into the moving contour geometry may be realized by performing a hit test between the handwriting point and the moving contour geometry.

The hit test between the handwriting point and the moving outline geometry is equivalent to determining whether the handwriting point is within the closed region of the moving contour geometry. To know whether the handwriting point is in the enclosed region presented thereby is equivalent to determining the data information used to characterize the closed region. It can be known that the moving contour geometry may have an irregular geometry shape, which is difficult to be represented by direct data information. Therefore, this embodiment considers disassembling the moving contour geometry, such as disassembling the moving contour geometry into a circle and the combination of geometry that are easy to be characterized such as polygons, and then determines whether the handwriting points exist in the closed region corresponding to each geometry after disassembly by the method of hit test.

For geometries in different forms, there may be different methods for the hit test for handwriting points. For example, for a circular region, the hit test may be realized by determining whether the linear distance between the handwriting point and the center of the circle is smaller than the radius. For another example, for a convex polygonal region, the hit test is realized by setting the sum of the corresponding vertex angles of the handwriting points to 360 degrees after the handwriting points that falls within the region constructs a triangle with the vertexes of each convex polygon. For another example, the hit test is realized by using a vector method in the rectangular region.

In this embodiment, after disassembling the moving contour geometry, the hit test for the handwriting point in each sub-graphic region may be realized, and when it is determined that the handwriting point exists in a certain region, the handwriting characterized by the handwriting point is determined as the target handwriting to be erased.

S207, erasing the target handwriting to be erased in the display interface.

In this embodiment, after the determining the target handwriting to be erased through the above steps, the erasure of the target handwriting to be erased may be realized through this step.

What is presented on the display interface in a visual form is that the eraser presented by the touch object moves on the display interface based on the erasing geometry shape, and the position where the eraser passes no longer displays the handwriting that the user has edited or written on the interface.

Figure 2A:
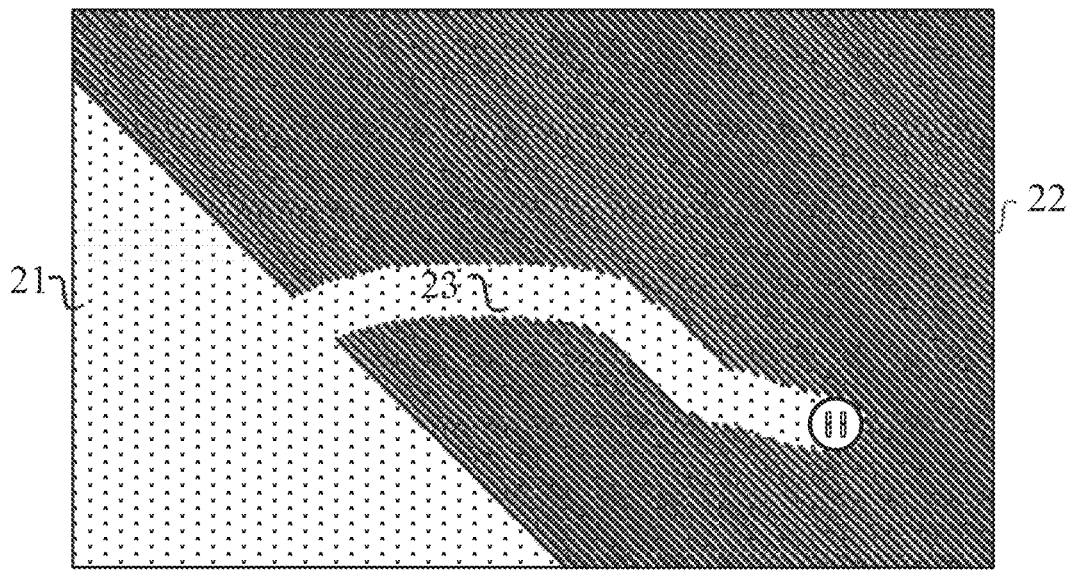
FIG. 2a is an effect diagram presented by a method for erasing handwriting according to Embodiment 2 of the present disclosure.

FIG. 2a shows an effect diagram presented by a method for erasing handwriting according to Embodiment 2 of the present disclosure. As shown in FIG. 2a, the handwriting 22 to be erased that has been written thereon has been presented in the display interface 21, and the user uses the controlled touch object to present the handwriting on the display interface 21 in the form of erasing a circle 23, and the previously displayed handwriting is no longer displayed on the region where the circle has been moved, but is presented as a blank area.

The method for erasing the handwriting according to Embodiment 2 of the present disclosure specifies the feedback form of touch point information and also specifies the erasing method of handwriting erasing. The implementation of the method is based on the premise that the touch response precision of the interactive board is equipped with a touch frame within a set precision range. As compared with the existing interactive board configured with a conventional touch frame, after the interactive board in this embodiment is configured with a high-precision touch frame at the hardware level, the high-precision touch frame may feedback more accurate touch points containing more effective information to the application layer information. Therefore, in combination with the method provided in this embodiment, it is ensured that the erasing response to the handwriting to be erased in the interface can better match the erasing geometry shape of the touch object used by the user, thereby realizing the flexible adjustment of the erasing region during the erasing process, which realizes the improvement of erasing efficiency on the interactive board.

Figure 2B:
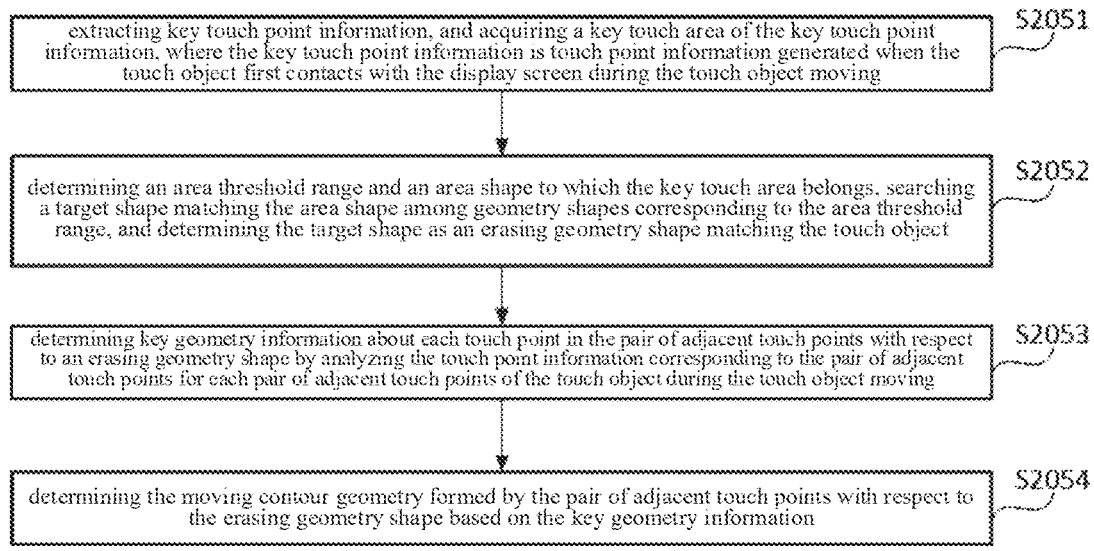
FIG. 2b is an implementation flowchart determined by an erasing form and a contour graphic in the method for erasing the handwriting according to Embodiment 2 of the present disclosure.

For the optional determination of the erasing geometry shape and the moving contour geometry, as a first optional example of the second embodiment, FIG. 2b shows an implementation flowchart determined by an erasing form and a contour graphic in the method for erasing the handwriting according to Embodiment 2 of the present disclosure. As shown in FIG. 2b, this first optional example further combines the above step of S205, that is, the determining an erasing geometry shape matching the touch object during the touch object moving based on the acquired touch point information, and determining a moving contour geometry formed by a pair of adjacent touch points during the touch object moving under the erasing geometry shape; is embodied as the following steps.

S2051, extracting principal touch point information, and acquiring a principal touch area of the principal touch point information. The principal touch point information is the touch point information generated in response to a movement by the touch object first contacts with the display screen during the touch object moving.

Exemplarily, the principal touch point information may be optionally understood as the information used to erase the principal touch point determined by the geometry shape in the touch point information fed back by the touch frame, and the principal touch point information also includes the touch area generated in response to a movement by displaying the display is recorded as the primary touch area.

In this embodiment, when the user controls the touch object to touch the display screen and move on the display screen, there is no situation that the touch object leaves the display screen during this process, so it may be considered that the form of the touch object used by the user in this process may not be changed, that is, the erasing geometry shape matching the touch object may not be changed during the entire moving process.

To simplify the operation of determining the erasing geometry shape, this embodiment does not need to determine the erasing geometry shape of the touch object based on the touch point information corresponding to each touch point, and may need to filter out one of the touch point information to determine the erasing geometry of the touch object. In this embodiment, the touch point information of the touch point generated in response to a movement by the touch object first contacts with the display screen is considered to perform the determination operation, and the touch point information is recorded as the principal touch point information.

It can be known that, in this embodiment, it is preferable but not optionally limited that the principal touch point information may use the corresponding touch point information at the first contact.

S2052, determining an area threshold range and an area shape to which the principal touch area belongs, searching a target shape matching the area shape among geometry shapes corresponding to the area threshold range, and determining the target shape as an erasing geometry shape matching the touch object.

In this embodiment, the area value of the principal touch area may be divided within a predetermined area threshold range, and this embodiment also pre-formulates multiple geometric forms that match each area threshold range. For example, an area threshold range may match multiple geometric forms, such as the combination of circles, circles and quadrilaterals, and the combination of circles and ellipses.

After the area shape is known, the target shape that matches the area shape may be determined from the geometries corresponding to the area threshold range. For example, if the area shape is a rectangle with an arc, the principal touch area may be considered to match the rounded rectangle, and the rounded rectangle may be used as the erasing geometric form of the touch object.

S2023, determining principal geometry information about each touch point in the pair of adjacent touch points with respect to an erasing geometry shape based on an analysis of the touch point information corresponding to the pair of adjacent touch points for each pair of adjacent touch points of the touch object during the touch object moving.

In this embodiment, the touch frame feeds back touch point information in a discrete form during the movement of the touch object in real time, each touch point information corresponds to a touch point, and two adjacent touch points may be regarded as a touch point pair. Considering that the function of the touch object in this embodiment is to realize handwriting erasure, each touch point generated during the movement of the touch object presents an allowable erasing region based on the above-mentioned determined erasing geometry shape. The principal geometry information of each touch point with respect to the erasing geometry shape may be optionally understood as the mathematical representation information used to characterize the erasing region presented by the touch point, and the mathematical representation information used for the associated closed region after the erasing region presented by two adjacent touch points is connected. The determined principal geometry information may at least include vertex information or circle center information and radius information of the erasing region presented in an erasing geometry shape.

In this embodiment, the principal geometry information of each touch point with respect to the erasing geometry shape may be acquired by combining the corresponding touch point information with the above-mentioned determined erasing geometry shape. Generally, after information such as coordinates of touch points, the touch height and width, and the touch rotation angle of the touch point, are known, mathematical operations may be used to determine the data information required for various graphic representations.

First, when the geometry shape of erasing is a rounded rectangle, the rounded rectangle includes a rectangle and rounded corners centered on each vertex of the rectangle. The implementation of the first optional implementation item of the above-mentioned step S2053 is optionally described as follows.

a1. recording the rounded rectangle as a first geometry to be constructed of each touch point in the pair of adjacent touch points.

In this embodiment, it is optional to record the erasing region on the display screen where each touch point used for handwriting erasing is represented as the geometry to be constructed corresponding to the touch point. In this embodiment, when the erasing geometric form is a rounded rectangle, the corresponding geometry to be constructed is recorded as the first geometry to be constructed.

b1, determining, for each touch point in the pair of adjacent touch points, coordinates of a center point of the rectangle in the first geometry to be constructed, coordinates of the circle center of each rounded corner, coordinates of each principal tangent point, and coordinates of a connection point of the two graphics through coordinates of touch points, a touch width, a touch height, and a touch rotation angle in the corresponding touch point information in combination with a radius of a predetermined rounded corner.

Exemplarily, this embodiment optionally describes the determination of the principal geometry information corresponding to the touch point when the erasing geometric form is a rounded rectangle from the perspective of mathematical calculations. FIGS. 2c-2h are relevant schematic diagrams determined by principal geometry information when the erasing geometry shape is a rounded rectangle in the method for erasing the handwriting according to Embodiment 2 of the present disclosure.

Considering that the interactive board according to this embodiment also has a response to the rotation operation performed during the movement of the touch object, this embodiment represents a rounded rectangle with a rotating rectangle and four rounded corners. The rotating rectangle may be considered as a rectangle with an angular offset in the horizontal and vertical directions of the display interface. And for the convenience of calculation, in this embodiment, it is optional to consider that an upper left corner of the display interface is zero-zero coordinates, and the abscissa becomes larger from left to right, and the ordinate becomes larger from top to bottom, as shown in FIG. 2c.

Figure 2C:
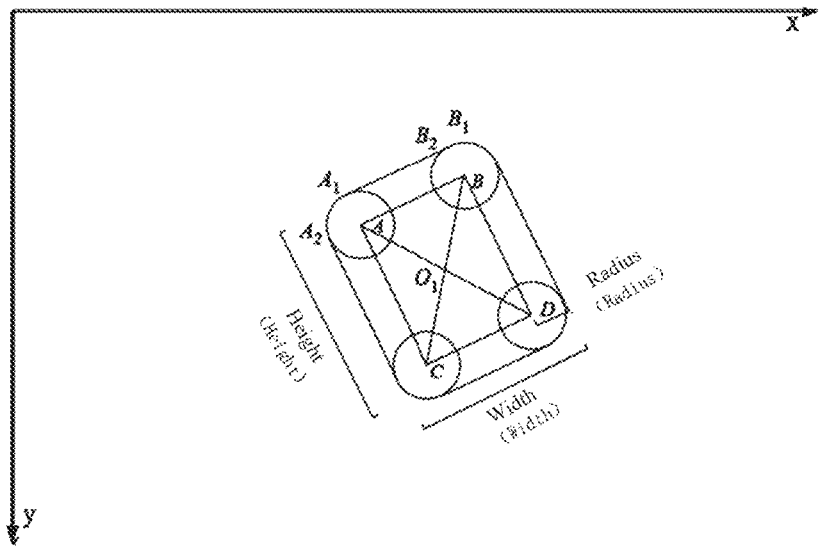
FIGS. 2c-2h are relevant schematic diagrams determined by principal geometry information when the erasing geometry shape is a rounded rectangle in the method for erasing the handwriting according to Embodiment 2 of the present disclosure.

FIG. 2c includes a first graphic to be constructed corresponding to one of the touch points, that is, the effect display of the rounded rectangle, points A, B, C and D construct the rotation rectangle of the rounded rectangle, and point A, B, C and D are respectively used as the centers of the four rounded corners contained in the rounded rectangle. After that, the adjacent two rounded corners are connected through tangent points, and the constructed combination graphics may be regarded as the rounded rectangle to be constructed, and the radius of the rounded corner in FIG. 2c is used as a configurable parameter, and the parameter value may be determined in advance. In addition, the sum of the length of the side length AC and the diameter of the rounded corner is equivalent to the height of the rounded rectangle, and the sum of the length of the side length CD and the diameter of the round corners is equivalent to the width of the rounded rectangle.

It can be known that each touch point in the pair of adjacent touch points has a corresponding rounded rectangle to be constructed. Considering that the geometric form of the rounded rectangle corresponding to each touch point is the same, it may be considered that the implementation manners of determining the corresponding geometry information for each rounded rectangle is the same. The geometry information required to characterize the rounded rectangle is equivalent to the determination of the coordinates of the vertexes and the coordinates of the tangent points in FIG. 2c above.

Alternatively, the problem of calculating the geometry information related to the rounded rectangle may be converted into the following mathematical problem.

First, the coordinates of touch point O1 may be determined based on the coordinates of the touch point, the height and width of the rounded rectangle may be determined by the height and width of the touch point, and the touch rotation angle and radius of the rounded corner may also be acquired. The touch rotation angle may be considered with respect to the above angle by which the horizontal and vertical axes of the given coordinate system are rotated. That is, after being converted into a data problem, it may be equivalent to: knowing O1, the rotation angle θ, the radius of the rounded corner, and the width and height of the rounded rectangle, how to obtain the vertex coordinates of the rotated rectangle in the rounded rectangle.

Considering that there is a rotation angle of the rounded rectangle with respect to the above coordinate system, to simplify the description, the vertex coordinates of the rounded rectangle may be determined first when the rotation angle is assumed to be 0.

Figure 2D:
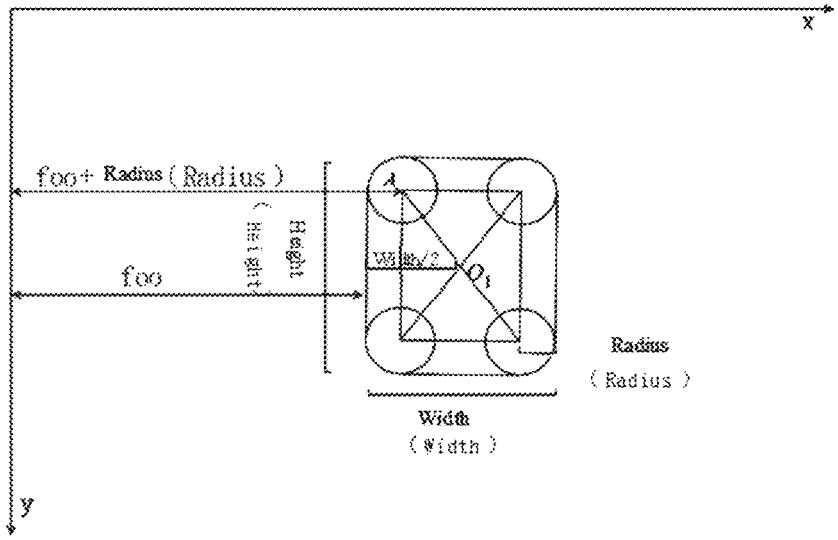

Optionally, calculation of the coordinates of point A with respect to O1 with known O1 may be performed under the rounded rectangle shown in FIG. 2d first. The optional formula is as follows:

$$O1.X = foo + \text{Width}/2$$

$$A.X = foo + \text{Radius}$$

$$A.X - O1.X = \text{coordinates of point } A \text{ with respect of } O1$$

$$= foo + \text{Radius} - (foo + \text{Width}/2)$$

$$= \text{Radius} - \text{Width}/2$$

Figure 2E:
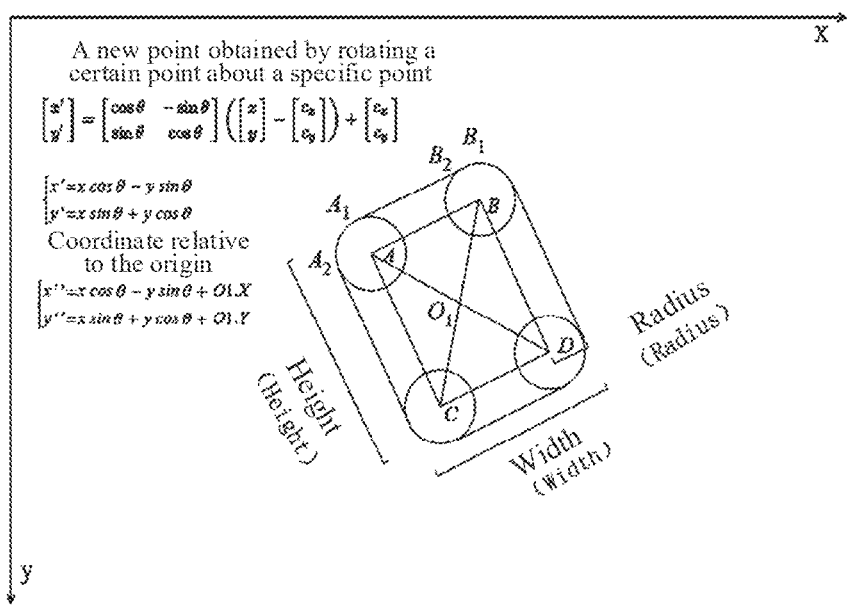

After the coordinates of point A are respectively determined through the above methods, based on the above calculation results, the calculation under the rounded rectangle as shown in FIG. 2e is carried out.

Alternatively, the rounded rectangle in FIG. 2d may be presented as the graphic shown in FIG. 2e after the operation of rotating by θ. At this time, it is equivalent to knowing the coordinates of point A and the rotation angle θ to determine coordinates of points A, B, C and D with respect to point O1 after rotating by θ.

Based on the new point formula (mainly reflected in FIG. 2e) obtained after a certain point is rotated by a specific point, the coordinates of point A after rotation with respect to O1 may be calculated. To make point A with respect to zero, it may make the coordinates of point A with respect to O1 are converted into coordinates with respect to the zero point, that is, the optional implementation is to add the coordinates of O1 to finally acquire the coordinates of point A after rotation.

Similarly, points B, C and D in the rounded rectangle to be constructed may also use the same calculation as above. Through the above description, the coordinates of the vertexes of the rotated rectangle in the rounded rectangle, that is, the coordinates of the circle centers of the rounded corners are acquired.

For the geometry information in the rounded rectangle, it may also acquire the coordinates of the tangent points used when two adjacent rounded corners are connected, and these tangent points are A1, A2, B1, and B2 as shown in FIG. 2c.

Alternatively, point A1 is equivalent to the difference between the ordinate of point A when not rotated and the radius of the rounded corner, and point A2 is equivalent to the difference between the abscissa of point A when not rotated and the radius of the rounded corner. From this, the coordinates of A1 and A2 may be calculated by using the new point formula obtained after a certain point is rotated by a specific point, and the coordinates of B1 and B2 may be calculated similarly.

The coordinates of each point required by each touch point in the pair of adjacent touch points to represent the rounded rectangle to be constructed may be calculated in the above manner. Sequentially, how to calculate the geometry information of each connection region formed by the connection of two rounded rectangles is described.

Figure 2F:
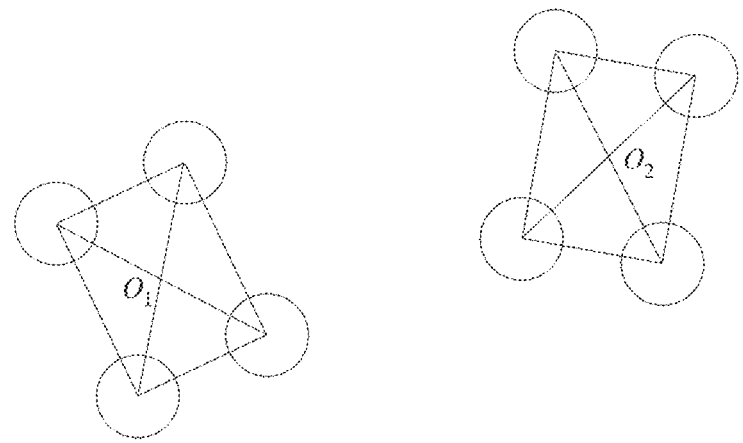

As shown in FIG. 2f, assuming that the rectangles have no rounded corners, the running tracks of the two rectangles are connected. Connection of the two rectangles may be tried in the following manners.

Combining the vertexes of the two rectangles with lines; acquiring two line segments that may not intersect with the rectangle itself, and a line segment connecting the center points of the two rectangles. The line segment connecting the center points of the two rectangles is used to check whether the two line segments that do not intersect the rectangle itself are correct, and the two correct line segments may be parallel to the line segment connecting the center points of the two rectangles.

Figure 2G:
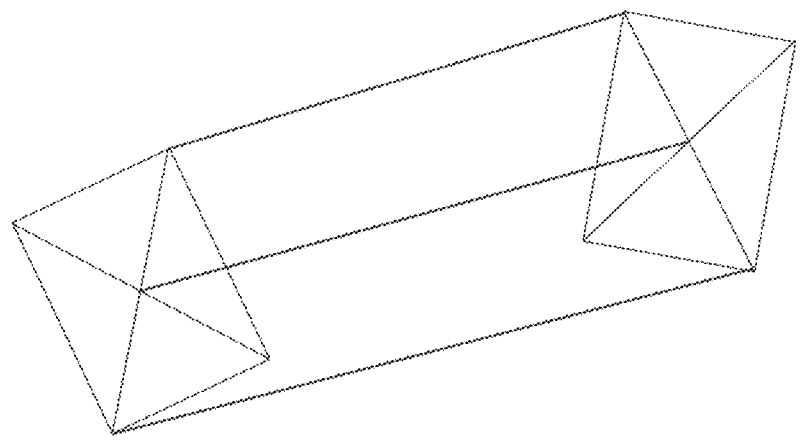

After being connected in the above manner, the connection state diagram shown in FIG. 2g may be obtained.

Figure 2H:
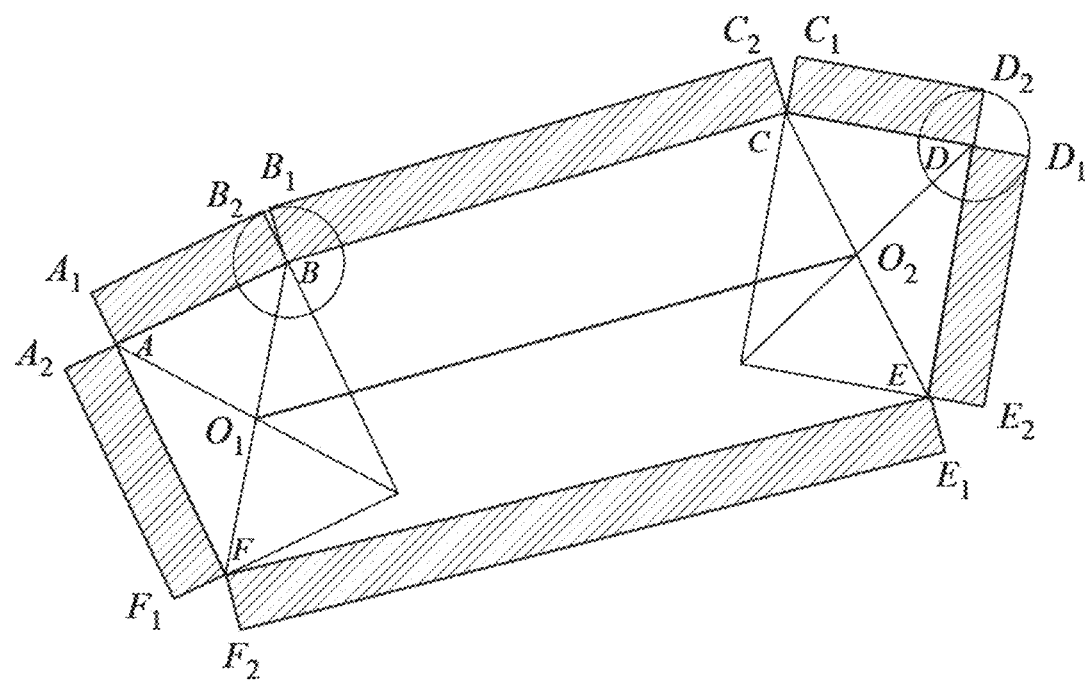

After calculating the connection line of the above two rectangles without rounded corners, the following is the calculation of the coordinates of each principal point associated with the connection of the two rounded corner rectangles after adding the rounded corners:

First, after adding rounded corners, the connection effect diagram of two rounded rectangles is shown in FIG. 2h.

As shown in FIG. 2h, it may be understood that the $B_1C_2$ line segment corresponding to the line segment BC is actually equivalent to moving the line segment BC horizontally for a certain distance. The moving distance is the radius of the rounded corner and the moving direction is outward.

When the coordinates of points B and C are known, the existing mathematical method may be used to obtain the line segment BC, and the line segment may be translated in a certain direction for a known distance, and the existing mathematical calculation method may also be used for calculation. Similarly, the coordinates of each vertex shown in FIG. 2h may be calculated. The calculated coordinates of each vertex in FIG. 2h are equivalent to the coordinates of the connection points of the two graphics after the adjacent touch points connect the corresponding rounded rectangles, and FIG. 2h also includes effect display of the moving contour geometry constructed after two rounded rectangles are connected.

c1. taking the coordinates of the center point of the rectangle, coordinates of the circle center of each rounded corner, the coordinates of each principal tangent point, and the coordinates of the connection point of the two graphics as the principal geometry information of the touch point with respect to the first geometry to be constructed.

Each rounded corner in the first geometry to be constructed includes two principal tangent points; each principal tangent point is a corresponding tangent point when the rounded corner is connected with an adjacent rounded corner by a tangent line.

The above mainly gives this step, that is, S2053 is the optional implementation of determining principal geometry information when the geometric shape of the erase is a rounded rectangle.

Secondly, when the erasing geometric form is circular, the implementation of the second optional implementation item of the above step S2053 is optionally described as follows.

a2, recording the circle as the second geometry to be constructed of each touch point in the pair of adjacent touch points.

For ease of distinction, in this optional implementation item, the erasing region whose geometry to be constructed is circular is recorded as the second geometry to be constructed.

b2, determining coordinates of the circle center and coordinates of principal intersection point of the corresponding second geometry to be constructed based on the coordinates of the touch point, the touch width, and the touch height in the touch point information corresponding to each touch point in the pair of adjacent touch points.

When determining the related geometry information of the circle to be constructed in this step, the touch point information of each touch point in the pair of adjacent touch points is also required. When determining the principal geometry information in this step, it may construct the connected two circular models first, and then calculate the required principal geometry information based on some geometric characteristics of the circle itself.

Alternatively, in this embodiment, the above step b1, that is, the determining, for each touch point in the pair of adjacent touch points, coordinates of a center point of the rectangle in the first geometry to be constructed, coordinates of the circle center of each rounded corner, coordinates of each principal tangent point, and coordinates of a connection point of the two graphics through coordinates of touch points, a touch width, a touch height, and a touch rotation angle in the corresponding touch point information in combination with a radius of a predetermined rounded corner is optionally optimized as follows.

Determining coordinates of the circle center corresponding to the second circle to be constructed through the coordinates of the touch point, the touch width and the touch height in the touch point information corresponding to each touch point in the pair of adjacent touch points; connecting the coordinates of corresponding two circle centers, and acquiring a line connecting the two circle centers; and constructing respectively straight lines perpendicular to the line connecting the two circle centers through the coordinates of circle centers, and acquiring the coordinates of the principal intersection point between each straight line and the corresponding second circle to be constructed.

Exemplarily, this embodiment still converts the above-mentioned principal geometry information about the circle into a mathematical problem for description. FIGS. 2i-2m show relevant schematic diagrams determined by the principal geometry information when the erasing geometry shape is a circle in the method for erasing the handwriting according to Embodiment 2 of the present disclosure.

Figure 2I:
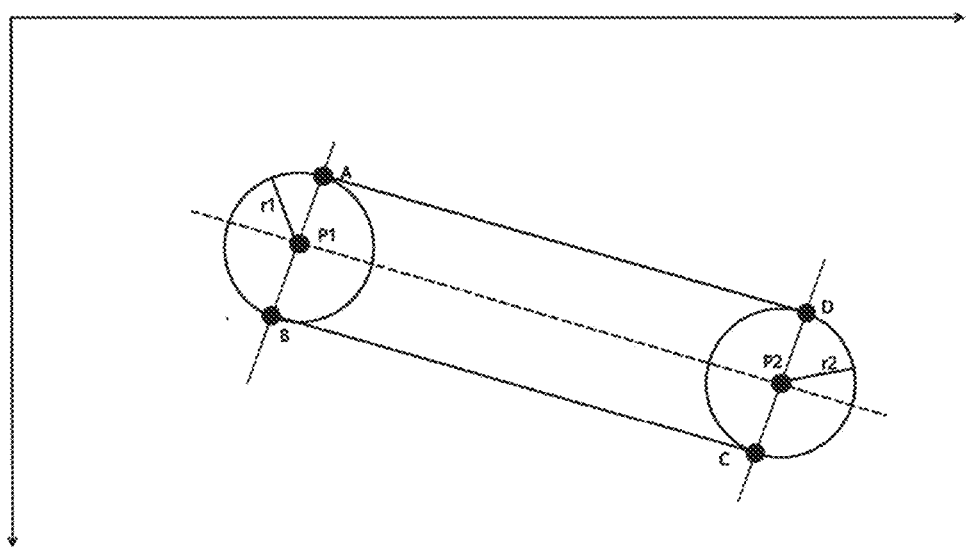
FIGS. 2i-2m are relevant schematic diagrams determined by the principal geometry information when the erasing geometry shape is a circle in the method for erasing the handwriting according to Embodiment 2 of the present disclosure.

First, as shown in FIG. 2i, two circular connections are included. Thus, the task of obtaining the principal geometry information of the two circles may be converted as follows: find the vertexes of the line segment parallel to the touch moving direction and intersecting the circle when the two circles are connected based on the touch moving direction.

In the above description, the abstract mathematical problem may be stated as follows: two circles are known, the centers of which are two points P1 and P2 respectively, and the radii are the lengths of r1 and r2 respectively; the line segment AB is perpendicular to the line segment P1P2, and the line segment CD is also perpendicular to the line segment P1P2, and the intersection points of the line segment AB and the circle are two points A and B respectively; and the intersection points of the line segment CD and the circle are two points C and D respectively; the coordinates of the four points A, B, C and D are obtained.

It may be noted that after knowing the touch point information of pair of adjacent touch points, the coordinates of the above-mentioned circle centers P1 and P2, and the radii r1 and r2 may be obtained by conventional calculation, and the touch movement direction may also be determined in real time based on coordinates of two touch points. For the coordinate calculation of the above four points, the optional description is as follows.

Since the two circles themselves may be regarded as independent, one of the circles is taken for calculation first, as shown in FIG. 2i, as the auxiliary line of the vertical abscissa, it can be seen that the included angle between the straight line P1P2 and the auxiliary line in the direction of the circle track passing through the circle center is angle θ. Based on the triangle calculation formula, it can be known that since the line segment AB is perpendicular to the line P1P2, the angle P2P1B is a right angle, and the angle B is also angle θ.

Figure 2J:
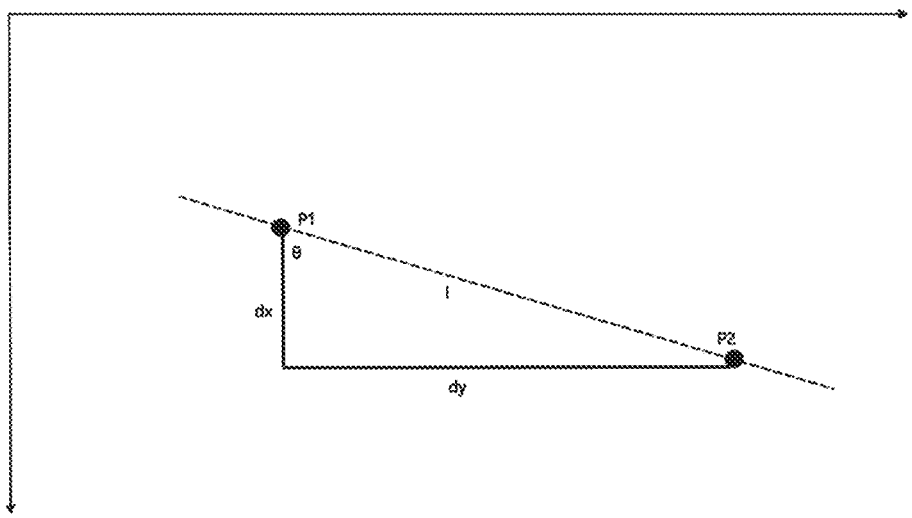
Figure 2K:
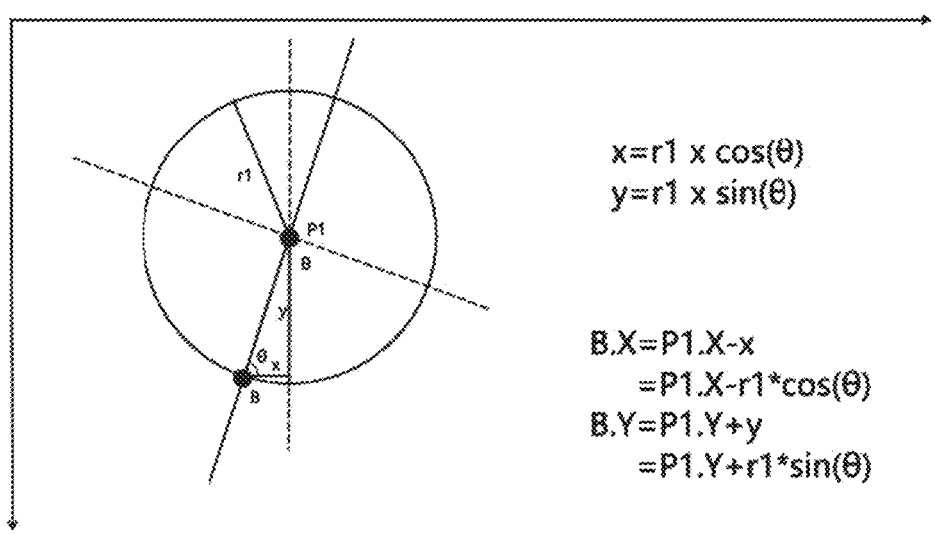
Figure 2L:
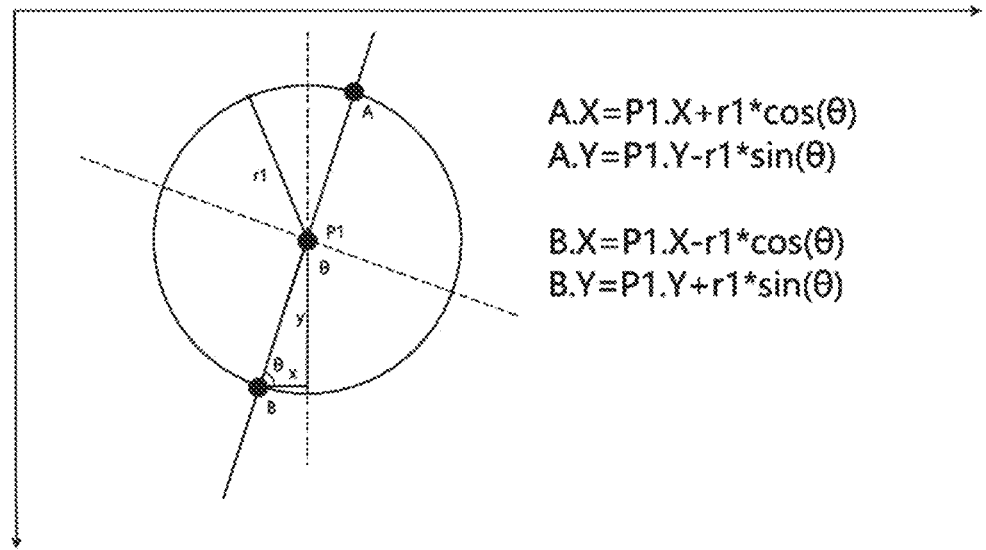
Figure 2M:
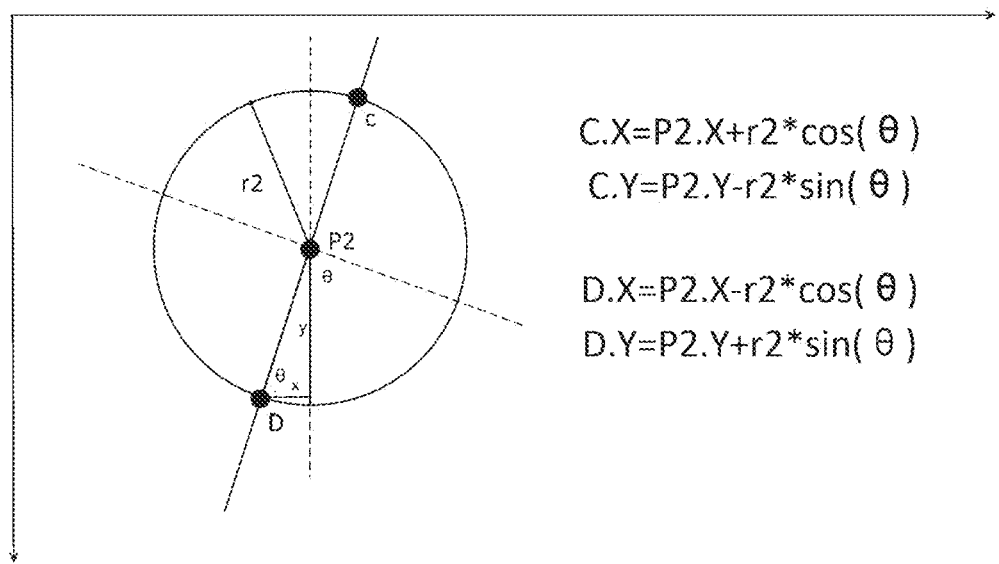

The above problem is equivalent to how to find the angle θ, as shown in FIG. 2*j*, by using the calculation shown in FIG. 2*j*. After the two points P1 and P2 are known, the angle θ may be calculated through these two points. After calculating the angle θ, the coordinates of point B may be calculated, and the optional calculation is shown in FIG. 2*k*. Similarly, the coordinates of point A may also be calculated by using the calculation method shown in FIG. 2*l*. Since the calculation manners of the two circles are the same, the coordinates of points C and D may be calculated in the same manner by using the manner in FIG. 2*m*.

In this step, after converting the calculation method into a mathematical problem, the coordinates of the center of the circle corresponding to each touch point may be determined, which is recorded as the coordinates of the center of the circle in this embodiment. At the same time, the coordinates of the principal intersection point formed after the connection of the two circles may also be calculated.

c2, denoting coordinates of the circle center corresponding to each touch point and the coordinates of each principal intersection point as principal geometry information with respect to the second geometry to be constructed.

It may be understood that the information of each coordinate point determined above may be used as the principal geometry information associated when the geometric form of the erasing is a circle.

The above mainly gives this step, that is, S2053 is the optional implementation of determining principal geometry information when the geometric shape of the erase is a rounded rectangle.

Thirdly, when the erasing geometric form is any irregular shape, the implementation of the third optional implementation item of the above step S2053 is optionally described as follows.

a3, recording the arbitrary irregular shape as the third geometry to be constructed of each touch point in the pair of adjacent touch points, and determining information of combined graphics contained in the third geometry to be constructed.

In this embodiment, any irregular shape may be understood as a combined set figure composed of broken lines and/or arcs, and in this embodiment, it is optional that the arbitrary irregular shape is the graphic presentation of the erasing region associated with each touch point in the pair of adjacent touch points. This embodiment is recorded as the third geometry to be constructed.

Through the presentation form of the irregular shape, it is possible to determine which graphic information is optionally included in the irregular shape, for example, it may include a broken line graphic or an arc graphic, and the determined information may be recorded as combined graphic information.

Figure 2N:
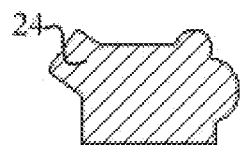
FIG. 2n is an effect display diagram when the erasing geometry shape is any irregular shape in the method for erasing the handwriting according to Embodiment 2 of the present disclosure.

Exemplarily, FIG. 2*n* shows an effect display diagram when the erasing geometry shape is any irregular shape in the method for erasing the handwriting according to Embodiment 2 of the present disclosure. As shown in FIG. 2*n*, the arbitrary irregular graphic 24 may be regarded as a combination of polygons and circles.

b3, determining, for each touch point in the pair of adjacent touch points, a principal tracing point existing on the third geometry to be constructed with respect to the touch point and the graphic representation information of the third geometry to be constructed by combining the information of the corresponding touch point with the information of combined graphics.

In this embodiment, the determination of the principal geometry information corresponding to the irregular shape may be realized in the following manner. Alternatively, in this embodiment, by combining the information of the corresponding touch point with the information of combined graphics, determining the principal tracing point existing on the third geometry to be constructed with respect to the touch point and the graphic representation information of the third geometry to be constructed may be embodied as follows.

b31, analyzing the information of combined graphics.

In this embodiment, the analysis of the combined graphics information may acquire what shape is optionally included in the arbitrary irregular shapes, such as polygons, arcs or circles, or polygons and polygons circle at the same time etc.

b32, responsive to determining that the third geometry to be constructed includes exclusively a polygon, determining the principal tracing point of the polygon with respect to the touch point through the corresponding touch point information, and acquiring first graphical representation information representing the polygon.

This step b32 mainly provides one of the cases, that is, if a polygon is exclusively included, the graphic representation information (first graphic representation information) associated with the irregular shape (combination of the polygon and the circle) and the principal tracing points existing when the irregular graphics corresponding to the two touch points are connected are determined.

Based on the above-mentioned optimization, the determining the principal tracing point of the polygon with respect to the touch point through the corresponding touch point information, and acquiring first graphical representation information representing the polygon includes:

determining coordinates of center points of sides of the polygon and coordinates of the vertexes of the sides of the polygon as the first graphic representation information through the coordinates of the touch point, the touch height and the touch width in the corresponding touch point information; and based on the coordinates of the center point of the sides of the polygon and the corresponding touch point information, selecting the principal tracing points satisfying a tracing point filtering condition from the coordinates of respective vertexes of the polygon.

Alternatively, in this embodiment, the above problem may also be converted into calculation of a mathematical problem. When the irregular shape exclusively includes a polygon, it may be considered to first obtain the central axis line in the direction of the touch movement. The direction of the touch movement may be determined by the coordinates of the two touch points; and then the largest distance from all vertexes of the polygon to the straight line of the central axis are taken as the principal tracing points to be calculated in the polygon.

Figure 2O:
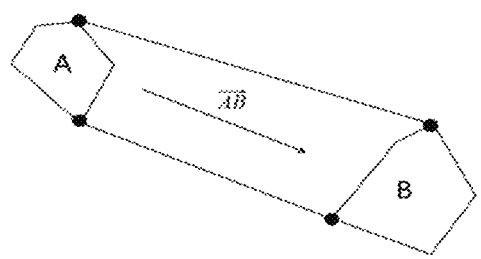
Figure 2P:
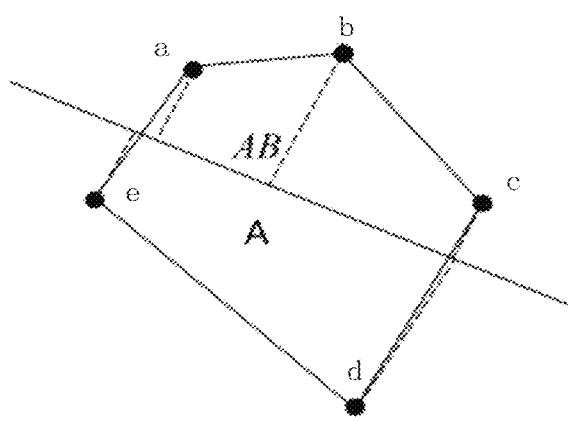
Figure 2Q:
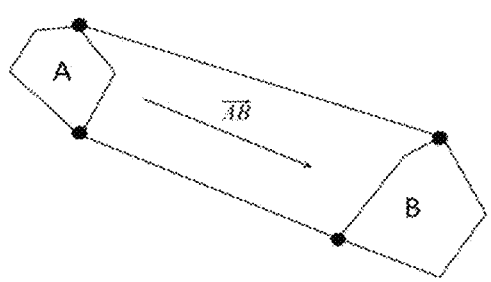

Exemplarily, FIGS. 2*o*-2*q* show relevant schematic diagrams determined by the principal geometry information when the erasing geometry shape is any irregular shape and exclusively includes polyline geometry in the method for erasing the handwriting according to Embodiment 2 of the present disclosure.

As shown in FIG. 2*o*, the above-mentioned calculation process may be abstracted to the mathematical problem as follows, given the polygons A and B and the touch movement direction AB, when the polygon A is converted into the polygon B along the movement direction, the moving track from the polygon A to the polygon B is obtained. The fundamental problem of the above calculation is to obtain two vertexes of each of the two polygons from the direction AB, and the corresponding vertexes are connected. Each vertex used for connection is equivalent to a principal tracing point.

Since each geometry is independent, calculation may be separately. In addition, since the touch movement direction is a vector, and the vector has no coordinates. The vertexes that may be selected for any polygon in any touch movement direction are obtained. It may understand the characteristics of this vertex, considering that the vector has no coordinates, so in the calculation implementation, the vector of the touch movement direction may be translated arbitrarily. And the best way is to translate the vector to the center point of the polygon.

At this time, the above problem may be converted into the problem of obtaining the two vertexes farthest from the straight line corresponding to the vector in the polygon, and these two vertexes are respectively located on both sides of the straight line. For the polygon shown in FIG. 2p, it may be learned that the distances from point b and point d to line segment AB are the farthest points on both sides of the line segment. Therefore, point b and point d may be regarded as two principal tracing points in the polygon shown in FIG. 2p.

It can be known that, using the same method to obtain the principal tracing point corresponding to the polygon corresponding to another touch point in the pair of adjacent touch points, and connecting the corresponding vertexes, the closed region formed by the two polygons may be obtained. The schematic diagram of the closed region finally formed is shown in FIG. 2q, that is, FIG. 2q also includes the effect display of the moving contour geometry formed by connecting two polygons.

b33, responsive to determining that the third geometry to be constructed includes a polygon and a target circle, determining a principal tracing point from the polygon and a principal circle through the corresponding touch point information, and acquiring second graphical representation information representing the polygon and the principal circle.

This step b33 mainly provides another situation, that is, when a circle (this embodiment is recorded as the target circle) is included in addition to the polygon, the graphic representation information (second graphic representation information) associated with the irregular shape (combination of the polygon and the circle) and the principal tracing points existing when the irregular graphics corresponding to the two touch points are connected are determined.

Based on the above-mentioned embodiments, the determining the principal tracing point from the polygon and the principal circle through the corresponding touch point information, and acquiring second graphical representation information representing the polygon and the principal circle may be embodied as follows.

through the coordinates of the touch point, the touch height and the touch width in the corresponding touch point information, determining the coordinates of center points of sides of the polygon and the coordinates of the vertex of the sides of the polygon, as well as the coordinate and a circle radius of the center point of the principal circle, and taking them as the second graphic representation information; and selecting the principal tracing points satisfying a tracing point filtering condition from the circumference of the principal circle and the coordinates of the vertexes of the sides of the polygon based on the coordinates of the center point of the polyline, the coordinates of the center point, the radius of the circle, and the corresponding touch point information.

Figure 2R:
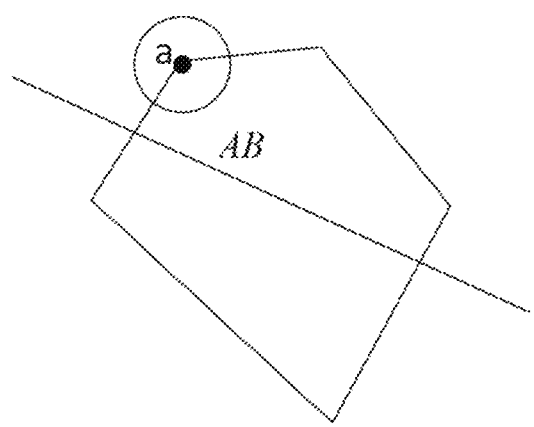
FIGS. 2r-2s are relevant schematic diagrams determined by the principal geometry information when the erasing geometry shape is any irregular shape in the method for erasing the handwriting according to Embodiment 2 of the present disclosure.
Figure 2S:
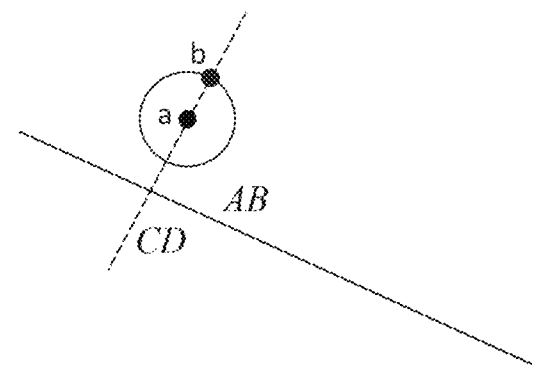

Exemplarily, this embodiment still converts the above-mentioned principal geometry information about the circle into a mathematical problem for description. FIGS. 2r-2s show relevant schematic diagrams determined by the principal geometry information when the erasing geometry shape is any irregular shape in the method for erasing the handwriting according to Embodiment 2 of the present disclosure.

First, the effect display of the irregular graphics is shown in FIG. 2r, which may include circles and polygons. Secondly, the optional implementation of this part may be abstracted as a mathematical problem, that is, the calculation method is to determine whether a certain tangent line of the circle is qualified as a principal tracing point. The determination method is: in FIG. 2r, first determining the distance between the center of the circle and the line segment AB, and then adding the distance to the radius of the circle, which is equal to the farthest distance from the circle to the line segment. If this distance satisfies the maximum distance, the tangency on the circle may thus be considered a primary tracing point.

The determination of the principal tracing point described above is described as follows: alternatively, as shown in FIG. 2s, if there is a principal tracing point in the current circle, obtain the principal tracing point of the circle. The intersection point between the auxiliary line CD perpendicular to line AB and the circle, which passes through the center of the circle may be first obtained. The principal trajectory point is point b, which is relatively far from AB.

c3 denotes the graphic representation information of respective combined graphics and respective principal tracing points as principal geometry information of the touch point with respect to the third geometry to be constructed.

It may be understood that, depending on the information of combined graphics, the three sub-steps included in the above b3 may be used to optionally realize different determinations of principal tracing points, and the determined principal tracing points and the graphic representation information of each combined graphics may be used as the third principal geometry information of the geometry to be constructed.

It may be noted that the graphic representation information of the above-mentioned combined graphics in this embodiment may generally be determined directly by combining the given touch point information with some parameter information, and the graphic representation information mainly includes the center point and vertex coordinates of the combined graphic, or coordinates of the circle center and circle radius information, etc.

S2054 determines the moving contour geometry formed by the pair of adjacent touch points with respect to the erasing geometry shape based on the principal geometry information.

In this embodiment, the principal geometry information determined above is equivalent to including the graphic representation information of the geometry to be constructed corresponding to the two touch points in the pair of adjacent touch points, and the relevant geometry information of the closed region formed after are connected. Therefore, through the above-mentioned principal geometry information, the required moving contour geometry may be constructed.

Since the moving contour geometry is also associated with different erasing geometry shapes, this embodiment further includes a definite implementation description of the corresponding moving contour geometry in different erasing geometry shapes.

First, it can be known that, on the basis that the erasing geometry shape is a rounded rectangle, and the principal geometry information is determined through the execution steps of the first optional implementation item in the above S2053, for determining the moving contour geometry in S2054, implementation is performed by using the following first optional implementation item.

a4, extracting the coordinates of the circle centers of the rounded corners of the corresponding rounded rectangle from the principal geometry information of the pair of adjacent touch points, and selecting the principal center point required for constructing bounding contour.

b4, acquiring principal circular regions respectively determined based on each of the principal center points.

c4, extracting coordinates of rectangle vertex and the coordinates of the center point of the corresponding rounded rectangle from the principal geometry information of the pair of adjacent touch points, and selecting a pair of principal connection points required for constructing bounding contour.

d4, acquiring bounding rectangle regions respectively determined based on each pair of principal connection points, and a vertex-connected enclosed region determined based on the coordinates of respective rectangle vertexes.

e4, combining each of the principal circular regions, each of the bounding rectangle regions, and the vertex-connected enclosed region to form a first moving contour geometry constructed by the pair of adjacent touch points with respect to the rounded rectangle.

Sequentially, from the above exemplary description of determining principal geometry information when the erasing geometric form is a rounded rectangle, it can be seen that the given FIG. 2h includes a moving contour geometry corresponding to a rounded rectangle, that is, the first moving contour geometry. In FIG. 2h, the first moving contour geometry includes 8 circular regions (alternatively, corresponding to the principal circular regions determined in the above two steps of a4 and b4), and further includes each filled rectangular region for filling display (alternatively, corresponding to the bounding rectangle regions respectively determined by the above two steps of c4 and d4), such as the rectangle $ABA_1B_2$, and the rectangle $AFA_2F_1$, etc., the pairs of principal connection points filtered out when the above two steps of c4 and d4 are determined may include $A_1B_2$, AB, AF, $A_2F_1$, $F_2E_1$, EF, BC and $B_2C_2$ etc.

In addition, through the above two steps of c4 and d4, the vertex-connected enclosed region may also be determined, such as the polygonal region formed based on the points ABCDEF in FIG. 2h, and the polygonal region is also included in FIG. 2h as a part of the first moving contour geometry.

Similarly, on the basis that the erasing geometry shape is a circle, and the principal geometry information is determined through the execution steps of the second optional implementation item in the above S2053, for the specific determination of the moving contour geometry in S2054, implementation is performed by using the following second optional implementation item.

a5, extracting the coordinates of the circle center from the principal geometry information of the adjacent touch points.

b5, acquiring the second geometry region to be constructed determined based on coordinates of respective circle centers.

c5, extracting the coordinates of the respective principal intersection points from the principal geometry information of the adjacent touch points.

d5, acquiring a connection region of principal intersection points determined based on the coordinates of each of the principal intersection points.

e5, combining each of the second geometries to be constructed with the connection region of the principal intersection points, and forming a second moving contour geometry constructed by the pair of adjacent touch points with respect to the circle.

Sequentially, from the above exemplary description of determining principal geometry information when the erasing geometric form is a circle, it can be known that the given FIG. 2i includes a moving contour geometry corresponding to a circle, that is, a second moving contour geometry. In FIG. 2i, two circular regions (alternatively, corresponding to the second geometry region to be constructed determined in the above two steps of a5 and b5) are included in the second moving contour geometry, a quadrilateral region (alternatively, corresponds to the connection region of principal intersection points determined in the above two steps of c5 and d5) is further included. The combination of the circular region and the principal intersection connecting region in FIG. 2i constructs the second moving contour geometry.

In addition, on the basis that the erasing geometry shape is any irregular shape, and the principal set information is determined through the execution steps of the third optional implementation item in the above S2053, for the optional determination of the moving contour set graphic in S2054, implementation is performed by using the following third optional implementation item.

a6, extracting the first graphical representation information or the second graphical representation information from the principal geometry information of the pair of adjacent touch points.

The first graphic representation information may optionally be the graphic representation information of a broken line polygon, the second graphic representation information may optionally be the combined graphic representation information of a broken line polygon and a circle.

b6, acquiring combined geometry respectively determined based on the corresponding first graphical representation information or the second graphical representation information.

The determined combined geometry is a polygon, or a combination of a polygon and a circle.

c6, extracting the principal tracing point from the principal geometry information of the pair of adjacent touch points.

d6, acquiring a principal track region formed by connecting each of the principal tracing points.

e6, combining each of the combined geometries with the principal track region to form a third moving contour geometry constructed by the pair of adjacent touch points with respect to the arbitrary irregular shape.

Sequentially, from the above exemplary description of determining principal geometry information when the erasing geometry shape is any irregular shape, taking FIG. 2q as an example, it may be used as the corresponding moving contour geometry when the irregular shape includes exclusively polygons. In FIG. 2q, two polygon regions may be acquired through the first graphical representation information; through the principal tracing point, the closed region formed by connecting the two polygons may be acquired, and the closed region is equivalent to the principal track region.

It may be noted that, for the optional determination of the target handwriting to be erased, as the second optional example of the second embodiment, optimization may be performed based on the above-mentioned first optional embodiment. Alternatively, based on the above-mentioned S205 of determining that the erasing geometry shape is a rounded rectangle, and determining the principal geometry information through the first optional implementation item corresponding to S2053, and determining the moving contour geometry through the first optional implementation item corresponding to S2054, the second optional example implements the determination of the target handwriting to be erased through the process shown in FIG. 2b.

Figure 2T:
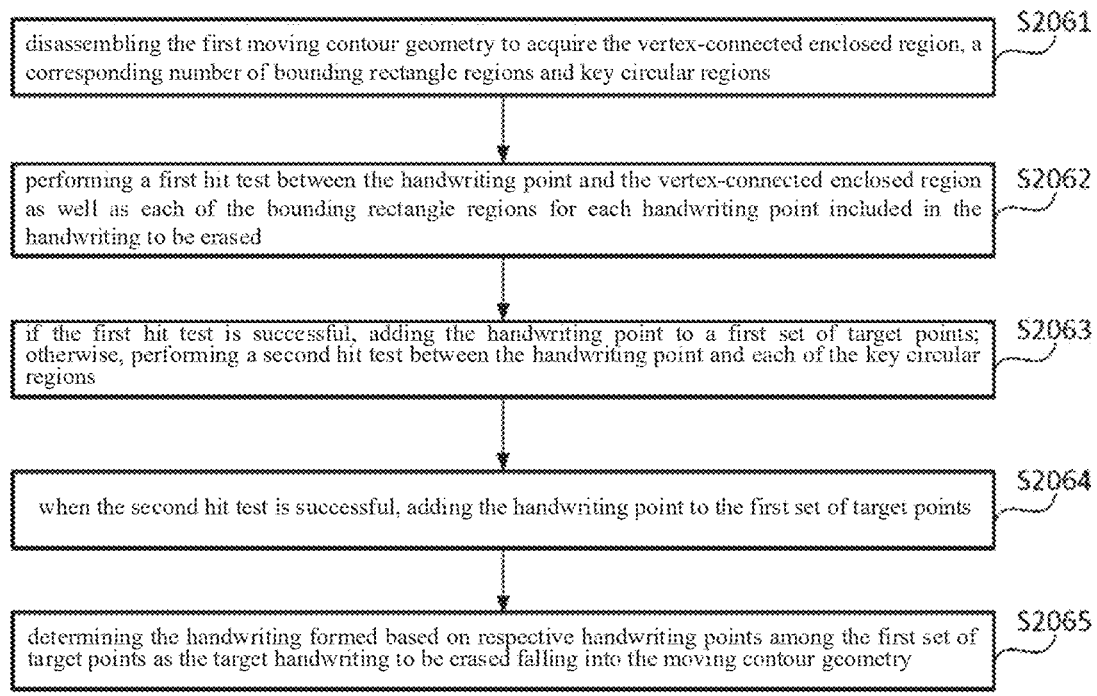
FIG. 2t is an implementation flowchart determined by target handwriting to be erased in the method for erasing the handwriting according to Embodiment 2 of the present disclosure.

FIG. 2t shows an implementation flowchart determined by target handwriting to be erased in the method for erasing the handwriting according to Embodiment 2 of the present disclosure. As shown in FIG. 2t, according to this second optional embodiment, the above-mentioned step of S206, that is, analyzing respective handwriting points included in the handwriting to be erased, performing a hit test between each of the handwriting points and the moving contour geometry to determine target handwriting to be erased falling within the moving contour geometry is optionally embodied as follows.

S2061, disassembling the first moving contour geometry to acquire the vertex-connected enclosed region, a corresponding number of bounding rectangle regions and principal circular regions.

Sequentially, from the above exemplary description of determining the principal geometry information when the erasing geometric form is a rounded rectangle, it can be seen that the given FIG. 2h includes the moving contour geometry corresponding to the rounded rectangle, and the figures included in the FIG. 2h after being disassembled includes the vertex-connected enclosed region, multiple bounding rectangle regions formed based on each principal connection point pair, and 8 principal circular regions.

S2062, performing a first hit test between the handwriting point and the vertex-connected enclosed region as well as each of the bounding rectangle regions for each handwriting point included in the handwriting to be erased.

In this embodiment, the optional implementation of performing the first hit test between the handwriting point and each of the bounding rectangle regions may include:

combining the vertex-connected enclosed region with each of the bounding rectangle regions to acquire a corresponding convex polygonal region, and acquire vertexes of respective regions for constructing a convex polygonal region; connecting the handwriting points to the vertexes of respective regions, and acquiring a same number of triangles as the vertexes of the regions; determining an angle value of the vertex angle constructed by the handwriting points in each of the triangles; and if a sum of the angle values is 360 degrees, determining that the first hit test for the handwriting point is successful.

Figure 3:
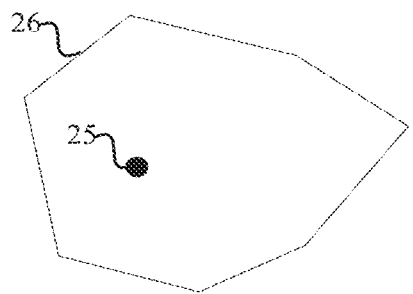
FIGS. 3 and 4 are schematic diagrams realized by a hit test that is used when the erasing geometry shape is a rounded rectangle in the method for erasing the handwriting according to Embodiment 2 of the present disclosure.
Figure 4:
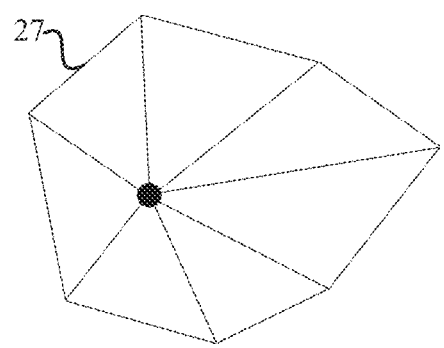

Exemplarily, FIGS. 3 and 4 are schematic diagrams realized by a hit test that is used when the erasing geometry shape is a rounded rectangle in the method for erasing the handwriting according to Embodiment 2 of the present disclosure. As shown in FIG. 3, assuming that a first point 25 is handwriting point to be hit tested, and a first polygon 26 is the contour corresponding to the abstracted first moving contour geometry, then the first point 25 and each vertex of the first polygon 26 is connected, constructs the first connection FIG. 27 as shown in FIG. 4; afterwards, the angle value of first point 25 in each triangle shown in FIG. 4 may be determined, finally whether the sum of angle value is 360 degrees may be calculated, if it is 360 degrees, it may be considered that the first hit test is successful.

S2063, if the first hit test is successful, adding the handwriting point to a first set of target points; otherwise, performing a second hit test between the handwriting point and each of the principal circular regions.

In this embodiment, the optional implementation of performing the second hit test between the handwriting point and each of the principal circular regions may include:

acquiring a circle center and a radius of each of the principal circular regions, and determining a linear distance between the handwriting point and each of the circle centers; and when there is a distance smaller than the corresponding radius, determining that the second hit test for the handwriting point is successful.

S2064, if the second hit test is successful, adding the handwriting point to the first set of target points.

S2065, determining the handwriting formed based on respective handwriting points among the first set of target points as the target handwriting to be erased falling within the moving contour geometry.

It can be known that all handwriting points that are successfully hit-tested with the first moving contour geometries are summarized in the first set of target points, and based on these handwriting points, it is possible to restore which handwriting to be erased in the display interface falls into the first moving contour geometry, these handwritings to be erased are taken as target handwritings to be erased.

Similarly, for the optional determination of the target handwriting to be erased, as the third optional example of the second embodiment, optimization may be performed based on the above-mentioned first optional embodiment. Alternatively, based on determining that the erasing geometry shape is a circle through the above-mentioned S205, and determining the principal geometry information through the second optional implementation item corresponding to S2053, and determining the moving contour geometry through the second optional implementation item corresponding to S2054, the third optional example implements the determination of the target handwriting to be erased through the process shown in FIG. 5.

Figure 5:
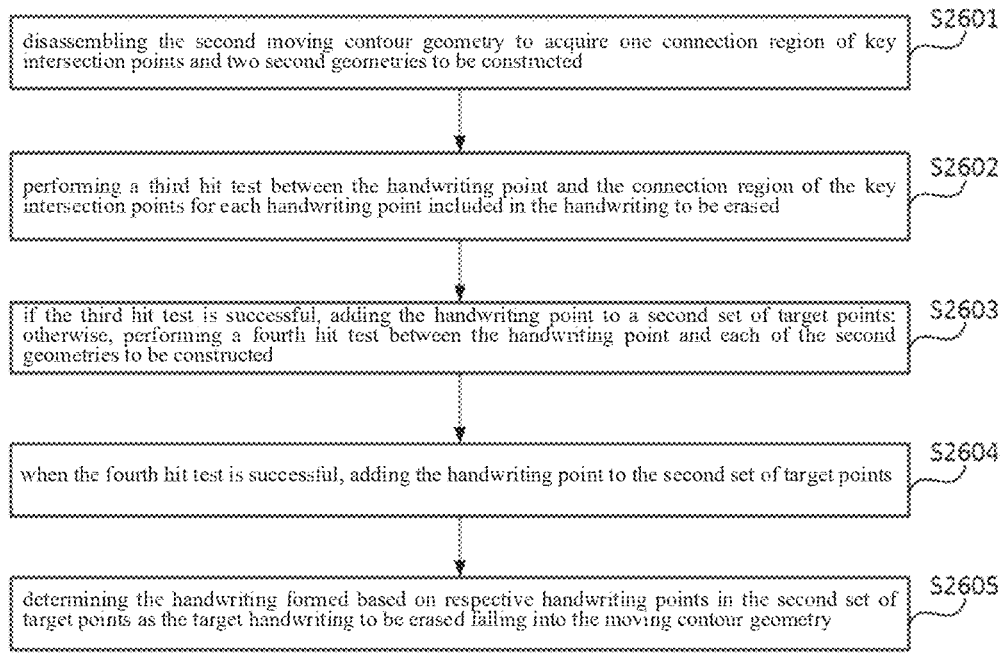
FIG. 5 is another implementation flowchart determined by target handwriting to be erased in the method for erasing the handwriting according to Embodiment 2 of the present disclosure.

FIG. 5 shows another implementation flowchart determined by target handwriting to be erased in the method for erasing the handwriting according to Embodiment 2 of the present disclosure. As shown in FIG. 5, this third optional example further combines the above-mentioned step of S206, that is, analyzing respective handwriting points included in the handwriting to be erased, performing a hit test between each of the handwriting points and the moving contour geometry to determine target handwriting to be erased falling within the moving contour geometry is optionally embodied as follows.

S2601, disassembling the second moving contour geometry to acquire one connection region of principal intersection points and two second geometries to be constructed.

Sequentially, from the relevant exemplary description of determining the principal geometry information when the geometric shape of erasing is a rounded rectangle, it can be known that the given FIG. 2i includes a moving contour geometry corresponding to a rounded rectangle. In FIG. 2i, after disassembling the included second moving contour geometry, there are two circular regions and a connection region of principal intersection points.

S2602, performing a third hit test between the connection region on the handwriting point and the principal intersection point for each handwriting point included in the handwriting to be erased.

In this embodiment, the third hit test is performed on the connection region between the handwriting point and the principal intersection point, which is optionally embodied as follows:

if determining that the connection region of principal intersection points is a rectangular region, the process includes selecting side vectors of two rectangles formed by a vertex from the rectangular region and performing the hit test between the handwriting point and the rectangular region by comparing the handwriting point with each of the side vectors. Otherwise, the process includes determining side vectors to be compared based on each vertex in the connection region of principal intersection points, where the number of side vectors to be compared is the same as that of the vertexes and performing the hit test between the handwriting point and the rectangular region by comparing the handwriting point with each of the side vectors to be compared.

Figure 6:
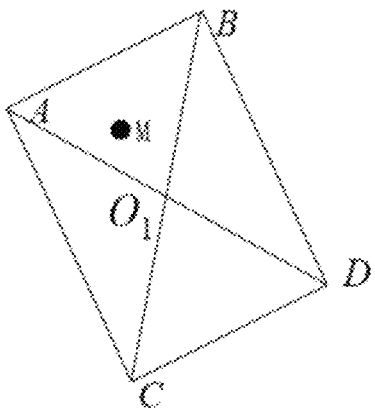
FIGS. 6 and 7 are schematic diagrams realized by a hit test that is used when the erasing geometry shape is circular in the method for erasing the handwriting according to Embodiment 2 of the present disclosure.
Figure 7:
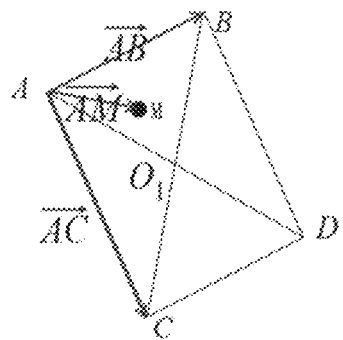

In this embodiment, the connection region of the principal intersection point is preferably a rectangular region (for example, the two circles have the same radius), but there are cases where it is not a rectangular region (for example, the two circles have different radii). This embodiment provides the implementation of the hit test in these two cases. Exemplarily, FIGS. 6 and 7 provide schematic diagrams realized by a hit test that is used when the erasing geometry shape is circular in the method for erasing the handwriting according to Embodiment 2 of the present disclosure.

When the connection region of the principal intersection is a rectangular region, the hit test problem may be converted to determining whether the point is in the rectangle. As shown in FIG. 6, the vertexes ABC and D of the rectangle are known, and the task is to determine whether the handwriting point M is in the rectangle. Sequentially, as shown in FIG. 7, three vectors AB, AC and AM may be made. Finally, whether the handwriting point is within the rectangle may be determined by the following formula $(0<AM \cdot AB<AB \cdot AB) \wedge (0<AM \cdot AC<AC \cdot AC)$. A handwriting point is considered to satisfy the third hit test if it is inside the rectangle.

In addition, when the connection region of the principal intersection point is an irregular polygon, after converting it into a mathematical problem, each vertex of the polygon may be first connected as a vector in the adjacent order. Determining that the point is in a certain direction of the vector, in fact, is equivalent to determining the angle between two vectors. At the same time, by determining geometrically adjacent points and two vectors formed by the points, the angle between the two vectors may be calculated.

The characteristic of the vector may be determined by its cross product. Alternatively, taking a point on the geometric edge, a clockwise or counterclockwise direction is arbitrarily selected, the point to the next adjacent point is connected to form a vector, and then the point and the point to be determined form a vector, and the value of the cross product of these two vectors is calculated.

If the cross products of all vectors are in the same direction, that is, the point is on the same side of the line segment set composed of all geometric adjacent sides, then the handwriting point is inside the irregular polygon. The directions of the cross products are considered to be the same when their values are greater than zero. If all the values of the cross product are greater than zero or less than zero, it proves that the handwriting points are inside the irregular polygon. If the value of the cross product is equal to zero, it is proved that the handwriting point is on a side of the irregular polygon.

S2603, if the third hit test is successful, add the handwriting point to a second set of target points; otherwise, perform a fourth hit test between the handwriting point and each of the second geometries to be constructed.

It can be known that the fourth hit test is also a test used to determine whether the handwriting point is within the circular region.

S2604, when the fourth hit test is successful, add the handwriting point to the second set of target points.

S2605, determining the handwriting formed based on respective handwriting points in the second set of target points as the target handwriting to be erased falling within the moving contour geometry.

Similarly, in the second set of target points, all the handwriting points that have successfully in the hit test with the second moving contour geometry are summarized, and based on these handwriting points, it is possible to restore which handwriting to be erased in the display interface falls into the second moving contour geometry, and these handwritings to be erased are used as target handwritings to be erased.

In addition, for the optional determination of the target handwriting to be erased, as shown in the fourth optional example of the second embodiment, it may be optimized based on the above-mentioned first optional example. Alternatively, it may be based on: determining that the erasing geometry shape is any irregular shape through the above S205, determining the principal geometry information through the third optional implementation item corresponding to S2053, and determining the moving contour geometry through the third optional implementation item corresponding to S2054. The fourth optional example implements the determination of the target handwriting to be erased through the process shown in FIG. 8.

Figure 8:
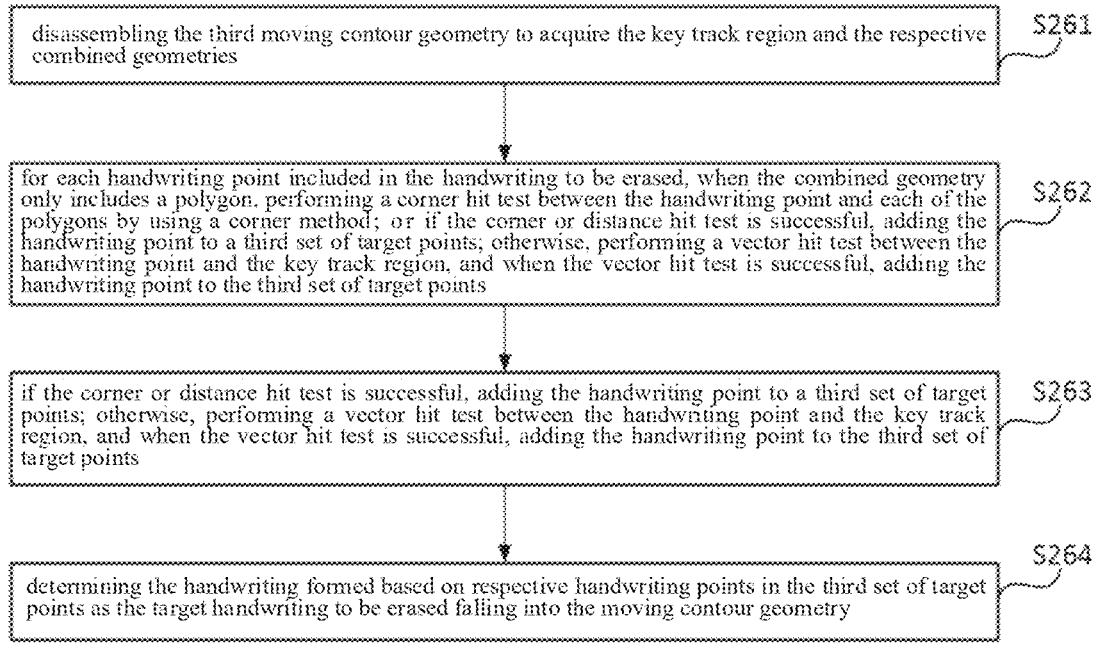
FIG. 8 is another implementation flowchart determined by target handwriting to be erased in the method for erasing the handwriting according to Embodiment 2 of the present disclosure.

FIG. 8 shows another implementation flowchart determined by target handwriting to be erased in the method for erasing the handwriting according to Embodiment 2 of the present disclosure. As shown in FIG. 8, this third optional example further combines the above-mentioned step of S206, including analyzing respective handwriting points included in the handwriting to be erased and performing a hit test between each of the handwriting points and the moving contour geometry to determine target handwriting to be erased falling within the moving contour geometry, as described below:

S261, disassembling the third moving contour geometry to acquire the principal track region and each combined geometry.

Sequentially, from the above exemplary description of determining principal geometry information when the erased geometry shape is any irregular shape, taking the above-mentioned FIG. 2q as an example, it may be used as the corresponding moving contour geometry when the irregular shape includes exclusively polygons. As shown in FIG. 2q, after disassembling the third moving contour geometry, two polygonal regions and a principal track region formed by principal tracing points may be obtained.

S262, for each handwriting point included in the handwriting to be erased, when the combined geometry includes exclusively a polygon, perform a corner hit test between the handwriting point and each of the polygons by using a corner method. When the combined geometries include a polygon and a principal circle, perform a distance hit test between the handwriting point and each of the polygons as well as the principal circle by using a distance method.

It can be known that the corner hit test may be understood as an implementation manner of the hit test described above based on FIGS. 3 and 4 in this embodiment. The distance hit test may be understood as the implementation of the hit test between handwriting points and circular regions in this embodiment.

For S263, if the corner or distance hit test is successful, add the handwriting point to a third set of target points; otherwise, perform a vector hit test between the handwriting point and the principal track region, and when the vector hit test is successful, add the handwriting point to the third set of target points.

It may also be known that the vector hit test may be understood as the implementation of the hit test based on the vector judgment of points and irregular polygons when the third hit test is described above in this embodiment.

S264, determining the handwriting formed based on respective handwriting points in the third set of target points as the target handwriting to be erased that falls within the moving contour geometry.

Similarly, in the third set of target points, all the handwriting points that have been hit tested successfully with the third moving contour geometry are summarized, and based on these handwriting points, it is possible to restore which handwriting to be erased in the display interface falls into the third moving contour geometry, and the handwriting to be erased are used as the target handwritings to be erased.

In the second embodiment, as a fifth optional example of the second embodiment, an optional implementation of the provided method for erasing handwriting is given. This fifth optional example may be embodied based on the above-mentioned first optional example. Alternatively, according to this fifth optional example, after the above-mentioned S205 of determining an erasing geometry shape matching the touch object during the touch object moving based on the acquired touch point information, the method for erasing the handwriting adds the following operations:

It may be noted that this optional case may be understood as when the erasing geometry shape is a rounded rectangle, the touch object does not move on the display screen, but contacts with the display screen in a static state. At this time, the touch point information fed back by the touch frame is the information of the touch point generated in response to a movement by the touch object is in contact with the display screen. Based on the touch point, an erasing region to be constructed whose erasing geometric form is a rounded rectangle may be formed, and the erasing region to be constructed is equivalent to a static rounded rectangle. Therefore, in this case, the implementation of this fifth optional example is as follows.

a. responsive to determining that the erasing geometry shape is a rounded rectangle and monitoring that the touch object does not move within a set time, determining a corresponding static touch point when the touch object contacts with the display screen within a set time.

The static touch point may be understood as a touch point corresponding to a touch signal generated in response to a movement by the touch object contacts the display screen for the first time. In this step, the touch point information of the static touch point may be obtained.

b, determining a static rounded rectangle with respect to the static touch point based on the touch point information of the static touch point.

Figure 9:
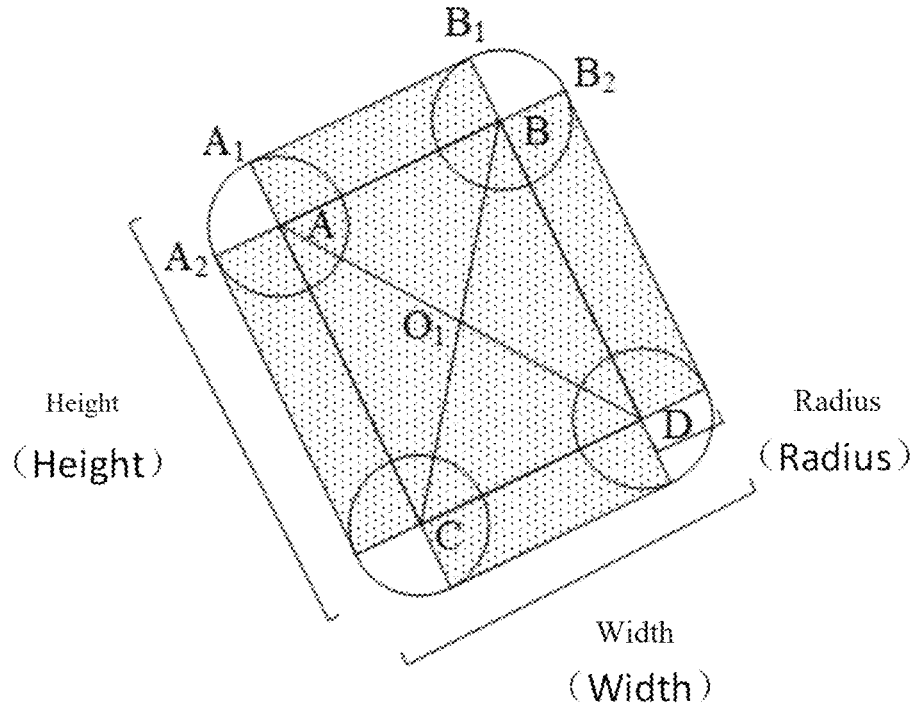
FIG. 9 is an effect display diagram of a static rounded rectangle in the method for erasing the handwriting according to Embodiment 2 of the present disclosure.

Through the relevant description of the rounded rectangle in the above embodiment, it can be known that after the touch point information of the static touch point is known, the relevant geometry information representing the static rounded rectangle may be determined. FIG. 9 shows an effect display diagram of a static rounded rectangle in the method for erasing the handwriting according to Embodiment 2 of the present disclosure. As shown in FIG. 9, it may be considered that the static rounded rectangle includes two rectangles (two filled rectangular regions) and four circles. That is, in this embodiment, preferably, the static rounded rectangle includes two static rectangular regions and four static circular regions.

Therefore, to determine the static rounded rectangle is equivalent to determining the relevant geometry information of the two rectangles and the four circles. And through the above-mentioned operation of determining the coordinates of the vertexes associated with the rounded rectangles in this embodiment, the coordinates of the vertexes of the above two rectangles, and the center coordinates and radius information of the four circles may also be determined, which is equivalent to acquiring the relative representation of a static rounded rectangle.

c, performing a hit test and each handwriting point included in the handwriting to be erased between the static rounded rectangle, and erasing the handwriting to be erased falling within the static rounded rectangle in the interface.

Based on the above-mentioned optimization, the performing a hit test between each handwriting point included in the handwriting to be erased and the static rounded rectangle, and erasing the handwriting to be erased falling within the static rounded rectangle in the interface includes:

performing the hit test between the handwriting point and two static rectangular regions as well as four circular regions respectively for each handwriting point in the handwriting to be erased; when the handwriting point satisfies a success condition of the hit test, adding the handwriting point into a set of static points; and erasing the handwriting formed based on respective handwriting points in the set of static points.

It may be understood that the test of the handwriting point and the static rounded rectangle optionally includes the hit test between the handwriting point and the rectangular region and the hit test between the handwriting point and the circular region. The test about the rectangular region may be realized through the above-mentioned description about the rectangular hit test (the vector method hit test), and the test for the circular region may also be realized through the above-mentioned description about the circular hit test (the distance method hit test).

Embodiment 3

Figure 10:
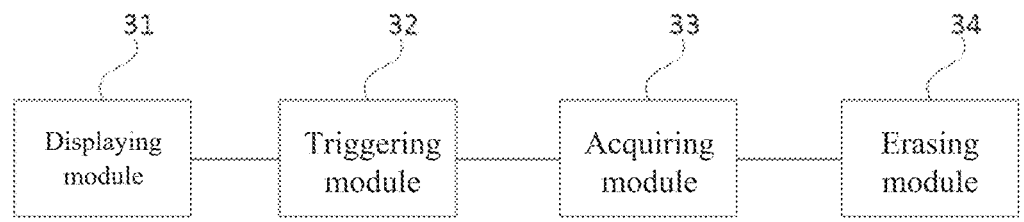
FIG. 10 is a structural block diagram of a device for erasing handwriting according to Embodiment 3 of the present disclosure.

FIG. 10 is a structural block diagram of a device for erasing handwriting according to Embodiment 3 of the present disclosure. The device for erasing handwriting may be integrated in an interactive board, wherein the touch response precision of the touch frame equipped in the interactive board is within the set precision range. The device may optionally include the following modules.

a displaying module 31, configured to display a display interface containing handwriting to be erased through a display screen;

a triggering module 32, configured to receive a handwriting erasing instruction, wherein if the device enter into a handwriting erasing mode, wherein the handwriting erasing instruction is generated by a user touch action;

an acquiring module 33, configured to acquire touch point information fed back through the touch frame when a touch object touches a surface of the display screen and moves on the surface, wherein the touch object is manipulated by the user;

an erasing module 34, configured to erase the handwriting to be erased in the interface along an erasing geometry shape matching the touch object based on an analysis of the acquired touch point information and the handwriting to be erased.

According to embodiment 3 of the present disclosure, a device for erasing handwriting is provided. The executive body of the device is the interactive board, which is equipped with a high-precision touch frame on the hardware structure, and functional optimization on the software application level of the configured high-precision touch frame can be realized by the method according to this embodiment. As compared with the existing interactive board that is not optimized at the software level, Embodiment 3 of the present embodiment integrates a device for erasing handwriting on the interactive board, which can ensure the erasing response of the handwriting to be erased in the interface to better match the erasing geometry shape of the touch object used by the user, so as to realize the flexible adjustment of the erasing region during the erasing process, thereby improving the erasing efficiency on the interactive board.

Further, the erasing geometry shape matching the touch object is represented by a touch area of the touch object acting on the display screen.

The erasing geometry shape includes a rounded rectangle, a circle and an arbitrary irregular shape.

Further, the acquiring module 33 is optionally configured to:

recognize each touch signal through a hardware circuit in the touch frame, and the touch signal is generated in response to a movement by the touch object on the display screen; and acquire the touch point information fed back by the touch frame for each of the touch signals through a human interface device (HID) standard protocol;

wherein one touch point information corresponds to one touch point, and the touch point information includes: coordinates of a touch point, a touch height and width, and a touch rotation angle.

Further, the device further includes an input processing module.

The input processing module may be configured to, after acquiring the touch point information fed back through the touch frame, process respective touch point information, so that each touch point information has a unified unit format and data structure.

Based on the above optimization, the input processing module processing each touch point information may optionally include:

converting a unit of each data information in the touch point information in a unified setting unit format based on acquired size information of the touch frame and screen resolution information; and recording the touch point information through a data structure corresponding to the set unit format.

Further, the erasing module 34 may optionally include:

a geometry-contour determining unit, configured to determine an erasing geometry shape matching the touch object during the touch object moving based on the acquired touch point information, and determine a moving contour geometry formed by a pair of adjacent touch points during the touch object moving under the erasing geometry shape;

a target-handwriting determining unit, configured to analyze each handwriting point included in the handwriting to be erased, perform a hit test between each of the handwriting points and the moving contour geometry, and determine that target handwriting to be erased falls into the moving contour geometry; and an erasing unit, configured to erase the target handwriting to be erased in the display interface.

Based on the above optimization, the geometry-contour determining unit may include:

an information acquiring sub-unit, configured to extract principal touch point information, and acquire a principal touch area of the principal touch point information, and the principal touch point information is the touch point information generated in response to a movement by the touch object first contacts with the display screen during the touch object moving;

a geometry determining sub-unit, configured to determine an area threshold range and an area shape to which the principal touch area belongs, search for a target shape that matches the area shape in each geometry shape corresponding to the area threshold range belonging thereto, and determine the target shape as an erasing geometry shape matching the touch object;

a geometry-information determining sub-unit, configured to determine principal geometry information about each touch point in the pair of adjacent touch points with respect to an erasing geometry shape based on an analysis of the touch point information corresponding to the pair of adjacent touch points for each pair of adjacent touch points of the touch object during the touch object moving; and a contour determining sub-unit, configured to determine the moving contour geometry formed by the pair of adjacent touch points with respect to the erasing geometry shape based on the principal geometry information.

Based on the above optimization, when the erasing geometry shape is a rounded rectangle, the rounded rectangle includes a rectangle and rounded corners with each vertex of the rectangle as a circle center;

The geometry-information determining sub-unit is optionally configured to:

record the rounded rectangle as a first geometry to be constructed of each touch point in the pair of adjacent touch points;

determine, for each touch point in the pair of adjacent touch points, coordinates of a center point of the rectangle in the first geometry to be constructed, coordinates of the circle center of each rounded corner, coordinates of each principal tangent point, and coordinates of a connection point of the two graphics through coordinates of touch points, a touch width, a touch height, and a touch rotation angle in the corresponding touch point information in combination with a radius of a predetermined rounded corner; and take the coordinates of the center point of the rectangle, coordinates of the circle center of each rounded corner, the coordinates of each principal tangent point, and the coordinates of the connection point of the two graphics as the principal geometry information of the touch point with respect to the first geometry to be constructed;

wherein each rounded corner in the first geometry to be constructed includes two principal tangent points; each principal tangent point is a corresponding tangent point when the rounded corner is connected with an adjacent rounded corner by a tangent line.

Further, the contour determining sub-unit may optionally configured to:

extract the coordinates of the circle centers of the rounded corners of the corresponding rounded rectangle from the principal geometry information of the pair of adjacent touch points, and select the principal center point required for constructing bounding contour;

acquire principal circular regions respectively determined based on each of the principal center points;

extract coordinates of rectangle vertex and the coordinates of the center point of the corresponding rounded rectangle from the principal geometry information of the pair of adjacent touch points, and select a pair of principal connection points required for constructing bounding contour;

acquire bounding rectangle regions respectively determined based on each pair of principal connection points, and a vertex-connected enclosed region determined based on the coordinates of respective rectangle vertexes; and combine each of the principal circular regions, each of the bounding rectangle regions, and the vertex-connected enclosed region, and form a first moving contour geometry constructed by the pair of adjacent touch points with respect to the rounded rectangle.

Based on the above optimization, the target-handwriting determining unit may optionally configured to:

disassemble the first moving contour geometry to acquire the vertex-connected enclosed region, a corresponding number of bounding rectangle regions and principal circular regions;

perform a first hit test between the handwriting point and the vertex-connected enclosed region as well as each of the bounding rectangle regions for each handwriting point included in the handwriting to be erased;

if the first hit test is successful, adding the handwriting point to a first set of target points; otherwise, perform a second hit test between the handwriting point and each of the principal circular regions;

if the second hit test is successful, add the handwriting point to the first set of target points; and determine the handwriting formed based on respective handwriting points among the first set of target points as the target handwriting to be erased falling within the moving contour geometry.

Further, the performing the first hit test between the handwriting point and the vertex-connected enclosed region as well as each of the bounding rectangle regions includes:

combining the vertex-connected enclosed region with each of the bounding rectangle regions to acquire a corresponding convex polygonal region, and acquire vertexes of respective regions for constructing a convex polygonal region;

connecting the handwriting points to the vertexes of respective regions, and acquiring a same number of triangles as the vertexes of the regions;

determining an angle value of the vertex angle constructed by the handwriting points in each of the triangles; and if a sum of the angle values is 360 degrees, determining that the first hit test for the handwriting point is successful.

Further, the performing second hit test between the handwriting point and each of the principal circular regions includes:

acquiring a circle center and a radius of each of the principal circular regions, and determining a linear distance between the handwriting point and each of the circle centers; and when there is a distance smaller than the corresponding radius, determining that the second hit test for the handwriting point is successful.

Based on the above optimization, the erasing module 34 further includes: a static-erasing unit.

The static-erasing unit may optionally include:

a static-point determining sub-unit, configured to after the determining an erasing geometry shape matching the touch object during the touch object moving based on the acquired touch point information, responsive to determining that the erasing geometry shape is a rounded rectangle and monitoring that the touch object does not move within a set time, determine a corresponding static touch point when the touch object contacts with the display screen within a set time;

a static-rectangle determining sub-unit, configured to determine a static rounded rectangle with respect to the static touch point based on the touch point information of the static touch point; and a static hit-test sub-unit, configured to perform a hit test between each handwriting point included in the handwriting to be erased and the static rounded rectangle, and erasing the handwriting to be erased falling within the static rounded rectangle in the interface.

Further, the static rounded rectangle includes two static rectangular regions and four static circular regions.

Correspondingly, the static hit-test sub-unit is optionally configured to:

perform the hit test between the handwriting point and two static rectangular regions as well as four circular regions respectively for each handwriting point in the handwriting to be erased;

when the handwriting point satisfies a success condition of the hit test, add the handwriting point into a set of static points; and erase the handwriting formed based on respective handwriting points in the set of static points.

Further, the geometry-information determining sub-unit is optionally configured to:

when the erasing geometry shape is a circle, record the circle as the second geometry to be constructed of each touch point in the pair of adjacent touch points;

determine coordinates of the circle center and coordinates of principal intersection point of the corresponding second geometry to be constructed based on the coordinates of the touch point, the touch width, and the touch height in the touch point information corresponding to each touch point in the pair of adjacent touch points; and take coordinates of the circle center corresponding to each touch point and the coordinates of each principal intersection point as principal geometry information with respect to the second geometry to be constructed.

Based on the above optimization, the determining coordinates of the circle center and the coordinates of the principal intersection point of the corresponding second geometry to be constructed based on the coordinates of the touch point, the touch width, and the touch height in the touch point information corresponding to each touch point in the pair of adjacent touch points may optionally include:

determining coordinates of the circle center corresponding to the second circle to be constructed through the coordinates of the touch point, the touch width and the touch height in the touch point information corresponding to each touch point in the pair of adjacent touch points;

connecting the coordinates of corresponding two circle centers, and acquiring a line connecting the two circle centers; and constructing respectively straight lines perpendicular to the line connecting the two circle centers through the coordinates of circle centers, and acquiring the coordinates of the principal intersection point between each straight line and the corresponding second circle to be constructed.

Further, the contour determining sub-unit may optionally configured to:

extract the coordinates of the circle center from the principal geometry information of the adjacent touch points;

acquire the second geometry region to be constructed determined based on the coordinates of respective circle centers;

extract the coordinates of the respective principal intersection points from the principal geometry information of the adjacent touch points;

acquire a connection region of principal intersection points determined based on the coordinates of each of the principal intersection points; and combine each of the second geometries to be constructed with the connection region of the principal intersection points, and form a second moving contour geometry constructed by the pair of adjacent touch points with respect to the circle.

Based on the above optimization, the target-handwriting determining unit may optionally configured to:

disassemble the second moving contour geometry to acquire one connection region of principal intersection points and two second geometries to be constructed;

perform a third hit test between the handwriting point and the connection region of the principal intersection points for each handwriting point included in the handwriting to be erased;

if the third hit test is successful, add the handwriting point to a second set of target points; otherwise, performing a fourth hit test between the handwriting point between each of the second geometries to be constructed;

when the fourth hit test is successful, add the handwriting point to the second set of target points; and determine the handwriting formed based on respective handwriting points in the second set of target points as the target handwriting to be erased falling within the moving contour geometry.

Further, the performing a third hit test between the handwriting point and the connection region of the principal intersection points includes:

if determining that the connection region of principal intersection points is a rectangular region, selecting side vectors of two rectangles formed by a vertex from the rectangular region, and performing the hit test between the handwriting point and the rectangular region by comparing the handwriting point with each of the side vectors; otherwise, determining side vectors to be compared based on each vertex in the connection region of principal intersection points, wherein the number of side vectors to be compared is the same as that of the vertexes; and performing the hit test between the handwriting point and the rectangular region by comparing the handwriting point with each of the side vectors to be compared.

Further, the geometry-information determining sub-unit is optionally configured to:

when the erasing geometry shape is an arbitrary irregular shape, record the arbitrary irregular shape as the third geometry to be constructed of each touch point in the pair of adjacent touch points, and determining information combined graphics contained in the third geometry to be constructed;

determine, for each touch point in the pair of adjacent touch points, a principal tracing point existing on the third geometry to be constructed with respect to the touch point and the graphic representation information of the third geometry to be constructed by combining the information of the corresponding touch point with the information of combined graphics; and take the graphic representation information of respective combined graphics and respective principal tracing points as principal geometry information of the touch point with respect to the third geometry to be constructed.

Further, by combining the information of the corresponding touch point with the information of combined graphics, determining the principal tracing point existing on the third geometry to be constructed with respect to the touch point and the graphic representation information of the third geometry to be constructed may optionally include:

analyzing the information of combined graphics;

responsive to determining that the third geometry to be constructed includes exclusively a polygon, determining the principal tracing point of the polygon with respect to the touch point through the corresponding touch point information, and acquiring first graphical representation information representing the polygon; and responsive to determining that the third geometry to be constructed includes a polygon and a target circle, determining a principal tracing point from the polygon and a principal circle through the corresponding touch point information, and acquiring second graphical representation information representing the polygon and the principal circle.

Further, the determining the principal tracing point of the polygon with respect to the touch point through the corresponding touch point information, and acquiring first graphical representation information representing the polygon may optionally include:

determining coordinates of center points of sides of the polygon and coordinates of the vertexes of the sides of the polygon as the first graphic representation information through the coordinates of the touch point, the touch height and the touch width in the corresponding touch point information; and based on the coordinates of center points of sides of the polygon and the corresponding touch point information, selecting the principal tracing points satisfying a tracing point filtering condition from the coordinates of respective vertexes of the polygon.

Further, the determining the principal tracing point from the polygon and the principal circle through the corresponding touch point information, and acquiring second graphical representation information representing the polygon and the principal circle may optionally include:

through the coordinates of the touch point, the touch height and the touch width in the corresponding touch point information, determining the coordinates of center points of sides of the polygon and the coordinates of the vertex of the sides of the polygon, as well as the coordinate and a circle radius of the center point of the principal circle, and taking them as the second graphic representation information; and selecting the principal tracing points satisfying a tracing point filtering condition from the circumference of the principal circle and the coordinates of the vertexes of the sides of the polygon based on the coordinates of the center points of the sides of the polygon, the coordinates of the center point, the radius of the circle, and the corresponding touch point information.

Based on the above optimization, the contour determining sub-unit may optionally configured to:

extract the first graphical representation information or the second graphical representation information from the principal geometry information of the pair of adjacent touch points;

acquire combined geometry respectively determined based on the corresponding first graphical representation information or the second graphical representation information;

extract the principal tracing point from the principal geometry information of the pair of adjacent touch points;

acquire a principal track region formed by connecting each of the principal tracing points; and combine each of the combined geometries with the principal track region to form a third moving contour geometry constructed by the pair of adjacent touch points with respect to the arbitrary irregular shape.

Based on the above optimization, the target-handwriting determining unit may optionally configured to:

disassemble the third moving contour geometry to acquire the principal track region and each combined geometry;

for each handwriting point included in the handwriting to be erased, when the combined geometry includes exclusively a polygon, perform a corner hit test between the handwriting point and each of the polygons by using a corner method; or, when the combined geometries includes a polygon and a principal circle, perform a distance hit test between the handwriting point and each of the polygons as well as the principal circle by using a distance method;

if the corner or distance hit test is successful, add the handwriting point to a third set of target points; otherwise, perform a vector hit test between the handwriting point and the principal track region, and when the vector hit test is successful, add the handwriting point to the third set of target points; and determine the handwriting formed based on respective handwriting points in the third set of target points as the target handwriting to be erased falling within the moving contour geometry.

Embodiment 4

Figure 11:
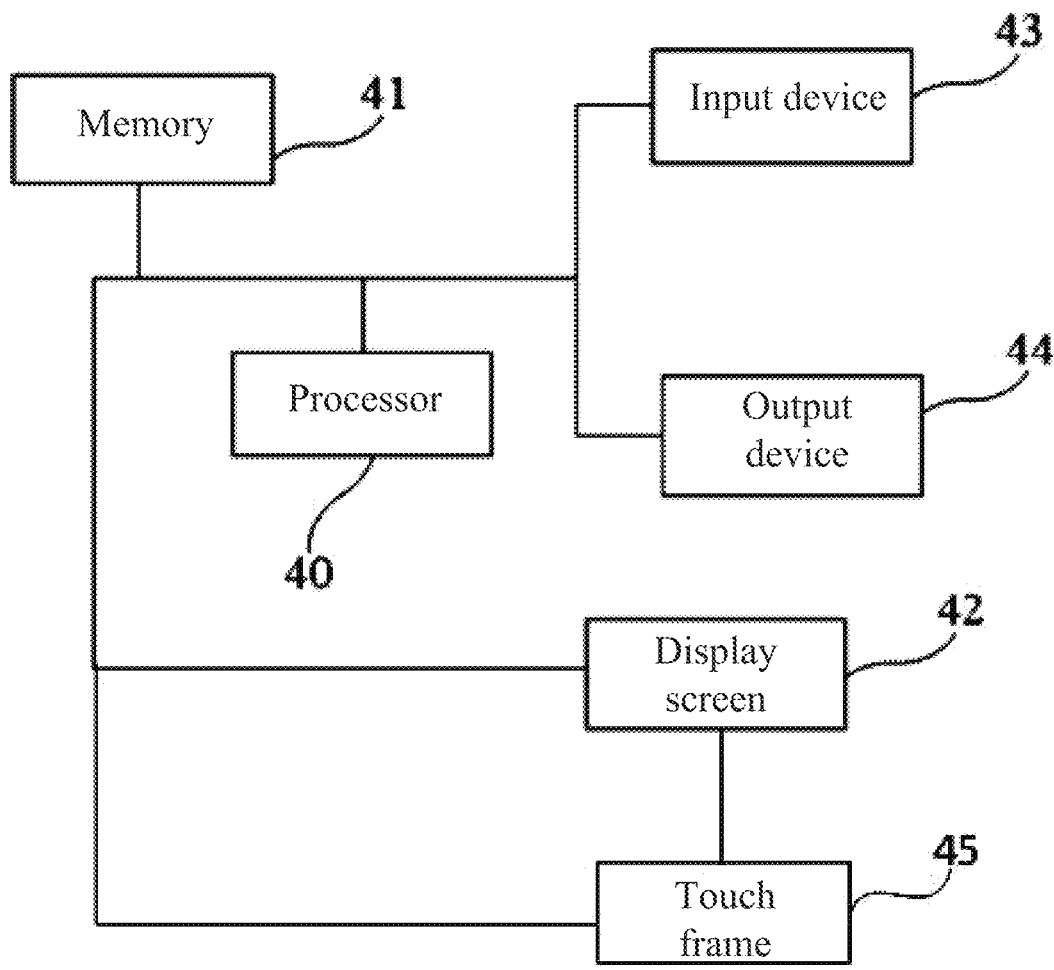
FIG. 11 is a schematic structural diagram of an interactive board according to Embodiment 4 of the present disclosure.

FIG. 11 is a schematic structural diagram of an interactive board according to Embodiment 4 of the present disclosure. The interactive board includes a processor 40, a memory 41, a display screen 42, an input device 43, an output device 44, and a touch frame 45. The number of processors 40 in the apparatus may be one or more, and FIG. 11 takes one processor 40 as an example. The number of memories 41 in the apparatus may be one or more, and FIG. 11 takes one memory 40 as an example. The processor 40, the memory 41, the display screen 42, the input device 43, the output device 44, and the touch frame 45 in the apparatus may be connected through a bus or other means, and FIG. 11 takes bus connection as an example.

The memory 41, as a computer-readable storage medium, may be configured to store software programs, computer executable programs, and modules, such as program instructions/modules corresponding to the fast annotation method in the embodiment of the present disclosure (for example, the displaying module 31, the triggering module 32, the acquiring module 33 and the erasing module 34 in the device for erasing handwriting). The memory 41 may mainly include a program storage area and a data storage area. The program storage area may store an operating system and at least one application required by a function; the data storage area may store data created according to the use of the device, etc. In addition, the memory 41 may include a high-speed random access memory, and may also include a non-volatile memory, such as at least one magnetic disk storage device, flash memory device, or other non-volatile solid-state storage devices. In some instances, the memory 41 may further include memory located remotely with respect to the processor 40, and these remote memories may be connected with the device through a network. Examples of the above-mentioned networks include, but are not limited to, the internet, intranets, local area networks, mobile communication networks, and combinations thereof.

The display screen 42 is covered by the touch frame 45 (the covering relationship is not shown in FIG. 11), which may constitute a touch screen for displaying interactive content. Generally, the display screen 42 is configured to display the interactive content, is further configured to receive touch operations on the display screen 42 and send corresponding signals to the processor 40 or other devices.

The input device 43 may be configured to receive input digital or character information and generate principal signal input related to user settings and function control of the display device, and may further be used to a camera for acquiring graphics and a sound pickup device for acquiring audio data. The output device 44 may include an audio device such as a speaker. It may be noted that the optional composition of the input device 43 and the output device 44 may be arranged according to actual conditions.

The touch response precision of the touch frame 45 reaches the set precision range, and is configured to respond to the touch operation of the touch object through the hardware circuit.

The processor 40 executes various functional applications and data processing of the device by running the software programs, instructions and modules stored in the memory 41, that is, realizes the above-mentioned method for erasing handwriting.

The interactive board provided above may be configured to execute the method for erasing the handwriting according to any of the above embodiments, and has corresponding functions and beneficial effects.

Embodiment 5

Embodiment 5 of the present disclosure also provides a storage medium containing computer-executable instructions, the computer-executable instructions are used to perform a method for erasing handwriting when executed by a computer processor. The method includes:

displaying, using a display screen, a display interface containing handwriting to be erased;

receiving a handwriting erasing instruction and entering into a handwriting erasing mode, wherein the handwriting erasing instruction is generated by a user touch action;

acquiring touch point information fed back through the touch frame when a touch object touches a surface of the display screen and moves on the surface, wherein the touch object is manipulated by the user; and erasing the handwriting to be erased in the interface along an erasing geometry shape matching the touch object based on an analysis of the acquired touch point information and the handwriting to be erased.

Of course, according to the embodiment of the present disclosure, a storage medium including computer executable instructions is further provided, and the computer executable instructions are used to perform relevant operation in the method for erasing the handwriting provided in any embodiment of the present disclosure when being executed by a computer processor, and have corresponding functions and beneficial effects.

Through the above description about the implementation, those skilled in the art can clearly understand that the present disclosure may be realized by means of software and requisite general-purpose hardware, and of course, it may also be realized by hardware, but in many cases the former is a better implementation. Based on this understanding, the technical solution of the present disclosure may be embodied in the form of a software product in essence or the part that contributes to the current technology, and the computer software product may be stored in a computer-readable storage medium, such as a floppy disk of a computer, Read-Only Memory (ROM), Random Access Memory (RAM), flash memory (FLASH), hard disk or CD, etc., including a number of instructions to make an interactive board (which may be a robot, a personal computer, server, or network equipment, etc.) executes the method for erasing the handwriting described in any embodiment of the present disclosure.

It may be noted that in the above-mentioned lecture recommendation device, the units and modules included are exclusively divided according to functional logic, but are not limited to the above-mentioned divisions, as long as the corresponding functions can be realized. In addition, the specific names of each functional unit are exclusively for the convenience of distinguishing each other, and are not used to limit the protection scope of the present disclosure.

It may be understood that each part of the present disclosure may be realized by hardware, software, firmware or a combination thereof. In the embodiments described above, various steps or methods may be implemented by software or firmware stored in memory and executed by a suitable instruction execution system. For example, if hardware implementation is used, similar to another embodiment, it may be implemented by any one or combination of the following techniques known in the art: discrete logic circuits, ASICs with suitable combinational logic gates, programmable gate arrays (PGAs), field programmable gate arrays (FPGAs), etc.

What is claimed is:

1. A method for erasing handwriting, performed by an interactive board to enable a touch frame equipped on the interactive board to achieve a touch response precision within a set precision range, the method comprising:

displaying, using a display screen, a display interface comprising the handwriting to be erased;

receiving a handwriting erasing instruction and entering into a handwriting erasing mode, wherein the handwriting erasing instruction is generated by a user touch action;

acquiring touch point information fed back through the touch frame when a touch object touches a surface of the display screen and moves on the surface, wherein the touch object is manipulated by the user;

determining, based on the acquired touch point information, the erasing geometry shape matching the touch object during the touch object moving, and determining a moving contour geometry formed by a pair of adjacent touch points during the touch object moving under the erasing geometry shape;

determining principal geometry information about each touch point in the pair of adjacent touch points with respect to an erasing geometry shape based on analyzing the touch point information corresponding to the pair of adjacent touch points for each pair of adjacent touch points of the touch object during the touch object moving; and erasing the handwriting to be erased in the interface along an erasing geometry shape matching the touch object based on analyzing the acquired touch point information and the handwriting to be erased, wherein the erasing geometry shape matching the touch object is represented by a touch area of the touch object acting on the display screen, and wherein when the erasing geometry shape is a rounded rectangle, the rounded rectangle includes a rectangle and rounded corners with each vertex of the rectangle as a circle center;

the determining principal geometry information about each touch point in the pair of adjacent touch points with respect to the erasing geometry shape based on analyzing the touch point information corresponding to the pair of adjacent touch points further comprises:

recording the rounded rectangle as a first geometry to be constructed of each touch point in the pair of adjacent touch points;

determining, for each touch point in the pair of adjacent touch points, coordinates of a center point of the rectangle in the first geometry to be constructed, coordinates of the circle center of each rounded corner, coordinates of each principal tangent point, and coordinates of a connection point of the two graphics through coordinates of touch points, a touch width, a touch height, and a touch rotation angle in the corresponding touch point information in combination with a radius of a predetermined rounded corner; and taking the coordinates of the center point of the rectangle, coordinates of the circle center of each rounded corner, the coordinates of each principal tangent point, and the coordinates of the connection point of the two graphics as the principal geometry information of the touch point with respect to the first geometry to be constructed, and wherein each rounded corner in the first geometry to be constructed includes two principal tangent points, and the principal tangent point is a corresponding tangent point when the rounded corner is connected with an adjacent rounded corner by a tangent line.

2. The method of claim 1, wherein the acquiring the touch point information fed back through the touch frame further comprises:

recognizing respective touch signals through a hardware circuit in the touch frame, wherein the touch signals are generated in response to a movement by the touch object on the display screen; and acquiring the touch point information fed back by the touch frame for each of the touch signals through a human interface device (HID) standard protocol, wherein one touch point information corresponds to one touch point, and the touch point information comprises coordinates of a touch point, a touch height and width, and a touch rotation angle.

3. The method of claim 1, wherein after the acquiring the touch point information fed back through the touch frame, the method for erasing the handwriting further comprises:

processing respective touch point information in a unified unit format and data structure.

4. The method of claim 3, wherein the processing the respective touch point information comprises:

converting a unit of each data information in the touch point information in a unified setting unit format based on acquired size information of the touch frame and screen resolution information; and recording the touch point information through a data structure corresponding to the set unit format.

5. The method of claim 1, wherein the erasing the handwriting to be erased in the interface along the erasing geometry shape matching the touch object based on analyzing the acquired touch point information and the handwriting to be erased further comprises:

analyzing respective handwriting points included in the handwriting to be erased, performing a hit test between each of the handwriting points and the moving contour geometry to determine target handwriting to be erased falling into the moving contour geometry; and erasing the target handwriting to be erased in the display interface.

6. The method of claim 1, wherein the determining, based on the acquired touch point information, the erasing geometry shape matching the touch object during the touch object moving, and determining the moving contour geometry formed by a pair of adjacent touch points during the touch object moving under the erasing geometry shape further comprises:

extracting principal touch point information, and acquiring a principal touch area of the principal touch point information, wherein the principal touch point information is the touch point information generated in response to a movement by the touch object first contacts with the display screen during the touch object moving;

determining an area threshold range and an area shape to which the principal touch area belongs, searching a target shape matching the area shape among geometry shapes corresponding to the area threshold range, and determining the target shape as an erasing geometry shape matching the touch object; and determining the moving contour geometry formed by the pair of adjacent touch points with respect to the erasing geometry shape based on the principal geometry information.

7. The method of claim 1, wherein the determining the moving contour geometry formed by the pair of adjacent touch points under the erasing geometry shape based on the principal geometry information further comprises:

extracting the coordinates of the circle centers of the rounded corners of the corresponding rounded rectangle from the principal geometry information of the pair of adjacent touch points, and selecting the principal center point required for constructing bounding contour;

acquiring principal circular regions respectively determined based on each of the principal center points;

extracting coordinates of rectangle vertex and the coordinates of the center point of the corresponding rounded rectangle from the principal geometry information of the pair of adjacent touch points, and selecting a pair of principal connection points required for constructing bounding contour;

acquiring bounding rectangle regions respectively determined based on each pair of principal connection points, and a vertex-connected enclosed region determined based on the coordinates of respective rectangle vertexes; and combining each of the principal circular regions, each of the bounding rectangle regions, and the vertex-connected enclosed region to form a first moving contour geometry constructed by the pair of adjacent touch points with respect to the rounded rectangle.

8. The method of claim 7, wherein the analyzing respective handwriting points included in the handwriting to be erased, performing the hit test between each of the handwriting points and the moving contour geometry to determine target handwriting to be erased falling within the moving contour geometry further comprises:

disassembling the first moving contour geometry to acquire the vertex-connected enclosed region, a corresponding number of bounding rectangle regions and principal circular regions;

performing a first hit test between the handwriting point and the vertex-connected enclosed region as well as each of the bounding rectangle regions for each handwriting point included in the handwriting to be erased;

if the first hit test is successful, adding the handwriting point to a first set of target points; otherwise, performing a second hit test between the handwriting point and each of the principal circular regions;

if the second hit test is successful, adding the handwriting point to the first set of target points; and determining the handwriting formed based on respective handwriting points among the first set of target points as the target handwriting to be erased falling within the moving contour geometry.

9. The method of claim 8, wherein the performing the first hit test between the handwriting point and each of the bounding rectangle regions comprises:

combining the vertex-connected enclosed region with each of the bounding rectangle regions to acquire a corresponding convex polygonal region, and acquire vertexes of respective regions for constructing the convex polygonal region;

connecting the handwriting points to the vertexes of respective regions, and acquiring a same number of triangles as the vertexes of the regions;

determining an angle value of the vertex angle constructed by the handwriting points in each of the triangles; and if a sum of the angle values is 360 degrees, determining that the first hit test for the handwriting point is successful.

10. The method of claim 8, wherein the performing second hit test between the handwriting point and each of the principal circular regions further comprises:

acquiring a circle center and a radius of each of the principal circular regions, and determining a linear distance between the handwriting point and each of the circle centers; and if there is a linear distance smaller than the corresponding radius, determining that the second hit test for the handwriting point is successful.

11. The method of claim 1, wherein after the determining the erasing geometry shape matching the touch object during the touch object moving based on the acquired touch point information, the method for erasing the handwriting further comprises:

responsive to determining that the erasing geometry shape is a rounded rectangle and monitoring that the touch object does not move within a set time, determining a corresponding static touch point when the touch object contacts with the display screen within a set time;

determining a static rounded rectangle with respect to the static touch point based on the touch point information of the static touch point; and performing a hit test between each handwriting point included in the handwriting to be erased and the static rounded rectangle, and erasing the handwriting to be erased falling within the static rounded rectangle in the interface.

12. The method of claim 11, wherein the static rounded rectangle comprises two static rectangular regions and four static circular regions;

correspondingly, the performing the hit test between each handwriting point included in the handwriting to be erased and the static rounded rectangle, and erasing the handwriting to be erased falling within the static rounded rectangle in the interface further comprises:

performing the hit test between the handwriting point and two static rectangular regions as well as four circular regions respectively for each handwriting point in the handwriting to be erased;

if the handwriting point satisfies a success condition of the hit test, adding the handwriting point into a set of static points; and erasing the handwriting formed based on respective handwriting points in the set of static points.

13. The method of claim 1, wherein when the erasing geometry shape is a circle, the determining principal geometry information with respect to the erasing geometry shape in the pair of adjacent touch points based on analyzing the touch point information corresponding to the pair of adjacent touch points further comprises:

recording the circle as the second geometry to be constructed of each touch point in the pair of adjacent touch points;

determining coordinates of the circle center and coordinates of principal intersection point of the corresponding second geometry to be constructed based on the coordinates of the touch point, the touch width, and the touch height in the touch point information corresponding to each touch point in the pair of adjacent touch points; and denoting coordinates of the circle center corresponding to each touch point and the coordinates of each principal intersection point as principal geometry information with respect to the second geometry to be constructed.

14. The method of claim 13, wherein the determining coordinates of the circle center and the coordinates of the principal intersection point of the corresponding second geometry to be constructed based on the coordinates of the touch point, the touch width, and the touch height in the touch point information corresponding to each touch point in the pair of adjacent touch points further comprises:

determining coordinates of the circle center corresponding to the second circle to be constructed through the coordinates of the touch point, the touch width and the touch height in the touch point information corresponding to each touch point in the pair of adjacent touch points;

connecting the coordinates of corresponding two circle centers, and acquiring a line connecting the two circle centers; and constructing respectively straight lines perpendicular to the line connecting the two circle centers through the coordinates of circle centers, and acquiring the coordinates of the principal intersection point between each straight line and the corresponding second circle to be constructed.

15. The method of claim 14, wherein the determining the moving contour geometry formed by the pair of adjacent touch points under the erasing geometry shape based on the principal geometry information further comprises:

extracting the coordinates of the circle center from the principal geometry information of the adjacent touch points;

acquiring the second geometry region to be constructed determined based on the coordinates of respective circle center;

extracting the coordinates of the respective principal intersection points from the principal geometry information of the adjacent touch points;

acquiring a connection region of principal intersection points determined based on the coordinates of each of the principal intersection points; and combining the second geometry to be constructed with the connection region of the principal intersection points, and forming a second moving contour geometry constructed by the pair of adjacent touch points with respect to the circle.

16. The method of claim 1, wherein when the erasing geometry shape is the irregular shape, the determining principal geometry information about each touch point in the pair of adjacent touch points with respect to the erasing geometry shape based on an analysis of the touch point information corresponding to the pair of adjacent touch points for each pair of adjacent touch points of the touch object during the touch object moving further comprises:

recording the irregular shape as a third geometry to be constructed of each touch point in the pair of adjacent touch points, and determining information of combined graphics contained in the third geometry to be constructed;

determining, for each touch point in the pair of adjacent touch points, a principal tracing point existing on the third geometry to be constructed with respect to the touch point and graphic representation information of the third geometry to be constructed by combining the information of the corresponding touch point with the information of combined graphics; and denoting the graphic representation information of respective combined graphics and respective principal tracing points as principal geometry information of the touch point with respect to the third geometry to be constructed.

17. The method of claim 16, wherein the determining the principal tracing point existing on the third geometry to be constructed with respect to the touch point and the graphic representation information of the third geometry to be constructed by combining the information of the corresponding touch point with the information of combined graphics, further comprises:

analyzing the information of combined graphics;

responsive to determining that the third geometry to be constructed includes exclusively a polygon, determining the principal tracing point of the polygon with respect to the touch point through the corresponding touch point information, and acquiring first graphical representation information representing the polygon; and responsive to determining that the third geometry to be constructed includes a polygon and a target circle, determining a principal tracing point from the polygon and a principal circle through the corresponding touch point information, and acquiring second graphical representation information representing the polygon and the principal circle.

18. An interactive board, comprising:

a touch frame having a touch response precision within a set precision range, configured to respond to a touch operation of a touch object through a hardware circuit included in the touch frame;

a display screen, configured to be covered by the touch frame to form a touch screen for displaying an interactive content;

one or more processors; and a memory device configured to store one or more programs;

wherein the one or more programs, when executed by the one or more processors, cause the one or more processors to perform the method of claim 1.

19. A storage medium storing computer executable instructions, wherein the computer executable instructions, when executed by a processor, perform the method of claim 1.

* * * * *